(12) United States Patent
Guha et al.

(10) Patent No.: US 11,868,406 B2
(45) Date of Patent: Jan. 9, 2024

(54) SMART INTERACTIONS FOR A DIGITAL DUPLICATE

(71) Applicant: TADA Cognitive Solutions, LLC, Peoria, IL (US)

(72) Inventors: Seshadri Guha, Peoria, IL (US); Harsh Shah, Elk Grove Village, IL (US); Subbarao Turlapati, Peoria, IL (US)

(73) Assignee: TADA Cognitive Solutions, LLC, Peoria, IL (US)

( * ) Notice: Subject to any disclaimer, the term of this patent is extended or adjusted under 35 U.S.C. 154(b) by 0 days.

(21) Appl. No.: 17/942,218

(22) Filed: Sep. 12, 2022

(65) Prior Publication Data
US 2023/0169122 A1 Jun. 1, 2023

Related U.S. Application Data

(63) Continuation of application No. 17/337,261, filed on Jun. 2, 2021, now Pat. No. 11,442,996, which is a
(Continued)

(51) Int. Cl.
*G06F 16/90* (2019.01)
*G06F 16/9035* (2019.01)
(Continued)

(52) U.S. Cl.
CPC ........ *G06F 16/9035* (2019.01); *G06F 16/287* (2019.01); *G06F 16/904* (2019.01);
(Continued)

(58) Field of Classification Search
CPC .............. G06F 16/287; G06F 16/9024; G06F 16/9035; G06F 16/9038; G06F 16/904; G06F 40/18; G06F 40/30
See application file for complete search history.

(56) References Cited

U.S. PATENT DOCUMENTS 6,301,579 B1 10/2001 Becker
2006/0184394 A1* 8/2006 Maughan ............... G16H 15/00
705/3
(Continued)

FOREIGN PATENT DOCUMENTS

WO 2020104342 A1 5/2020

OTHER PUBLICATIONS

YouTube Video entitled "DevExpress Dashboards: Master Filtering and Drill Down", by DevExpress, Uploaded on Mar. 6, 2015, available at https://www.youtube.com/watch?v=cUEosMn613A (Year: 2015).*

(Continued)

*Primary Examiner* — Mahesh H Dwivedi
(74) *Attorney, Agent, or Firm* — Lee Sullivan Shea & Smith LLP

(57) ABSTRACT

Disclosed herein is a software tool that may be used to create and navigate through visualizations of an organization's data as embodied in a digital duplicate. These "smart interactions" may allow a user to visually and intuitively traverse the semantic network to dynamically provide on-demand visualization of the business data. Based on the traversal of the network, the network can be simplified and/or subnetworks can be created. As part of the visualization, "perspectives" can be created based on focal points (i.e., nodes) in the network. The focal points may be used as a starting point for the traversal, and functions (e.g., aggregates) can be dynamically applied to produce subnetworks to provide data for visualizations.

22 Claims, 15 Drawing Sheets

Related U.S. Application Data continuation of application No. 16/876,024, filed on May 16, 2020, now Pat. No. 11,055,358.

(51) Int. Cl.
  *G06F 16/904* (2019.01)
  *G06F 16/901* (2019.01)
  *G06F 16/28* (2019.01)
  *G06F 40/30* (2020.01)
  *G06F 16/9038* (2019.01)

(52) U.S. Cl.
  CPC ...... *G06F 16/9024* (2019.01); *G06F 16/9038* (2019.01); *G06F 40/30* (2020.01)

(56) References Cited

U.S. PATENT DOCUMENTS

| | | | |
|---|---|---|---|
| 2007/0118813 | A1 | 5/2007 | Forstall et al. |
| 2009/0100377 | A1 | 4/2009 | Miyamoto et al. |
| 2009/0248883 | A1 | 10/2009 | Suryanarayana et al. |
| 2013/0007577 | A1 | 1/2013 | Hammoud |
| 2013/0332363 | A1 | 12/2013 | Renard et al. |
| 2015/0288569 | A1 | 10/2015 | Agarwal et al. |
| 2016/0224232 | A1 | 8/2016 | Pourshahid |
| 2016/0275122 | A1* | 9/2016 | Kara .................... G06F 16/248 |
| 2017/0075552 | A1 | 3/2017 | Berenbaum et al. |
| 2018/0341388 | A1 | 11/2018 | Zheng et al. |
| 2020/0019548 | A1 | 1/2020 | Agnew et al. |
| 2020/0019549 | A1 | 1/2020 | Agnew et al. |
| 2021/0224328 | A1 | 7/2021 | Schrupp et al. |
| 2021/0365480 | A1 | 11/2021 | Kazem et al. |

OTHER PUBLICATIONS

Article entitled "Role Based Security Stopping Certain Users from Accessing Drill Through Reports", by Maggie, dated Jan. 24, 2019, available at https://community.powerbi.com/t5/Desktop/Role-Based-Security-stopping-certain-users-from-accessing-drill/m-p/607336 (Year: 2019).*

TADA Beyond data, "Building with TADA—Tada Cognitive Solutions", https://tada.zendesk.com/hc/en-us/categories/360000658454-Building-with-Tada, retrieved from the Internet Oct. 30, 2020, 4 pages.

TADA Beyond data, "Getting Started—Tada Cognitive Solutions", https://tada.zendesk.com/hc/en-us/categories/360000306154-Getting-Started, retrieved from the Internet Oct. 30, 2020, 20 pages.

TADA Beyond data, "The Tada App—Tada Cognitive Solutions", https://tada.zendesk.com/hc/en-us/categories/360001618714-The-Tada-App, retrieved from the Internet Oct. 30, 2020, 60 pages.

"Introduction to TADA—Tada Cognitive Solutions", https://vimeo.com/210828651, Uploaded Thursday, Mar. 30, 2017 at 3:38 PM EST via Parallel Uploader, downloaded from Internet Apr. 20, 2021.

"Hello, we're TADA!—Tada Cognitive Solutions", https://vimeo.com/237788154, Uploaded circa 2017, downloaded from Internet Apr. 20, 2021. 2 pages.

"Tada Suite Tutorial-Tada Cognitive Solutions", https://www.youtube.com/watch?v=_xQp-j3Rbog, Uploaded Jan. 21, 2020, 1 page.

Derntl, Michael et al., An Embeddable Dashboard for Widget-Based Visual Analytics on Scientific Communities, ACM 978-1-4503-1242-4/12/09, 8 pages, 2012.

"Tada! Business Solutions in the Age of Big Data", by iBi, dated Oct. 2017, 11 pages.

Plourde, Allison, "Startup GP Spotlight: Tada", Oct. 2, 2017, 6 pages.

Tweets entitled "Tada Cognitive Solutions", by Tada, on Oct. 23, 2018, 4 pages.

YouTube Video entitled "Multi-Level Cross Chart Filtering", by Zoomcharts, Uploaded on Nov. 25, 2019, available at https://www.youtube.com/watch?v=9P3ke1eF2-E, 6 pages.

YouTube Video entitled "Power BI Drill in 3 Easy Steps! Drill to Another Page", by Singh, Uploaded on Sep. 25, 2019, available at https://www.youtube.com/watch?v=WdBeJ8j98Me, 9 pages.

YouTube Video entitled "Power B1 Cross Filtering—Free Sample Lesson", by Jon, Uploaded on Dec. 20, 2018, available at https://www.youtube.com/watch?v=nRTOHmqyhoo, 9 pages.

YouTube Video entitled "Advanced (Drill Down) Combo Bar Visual by ZoomCharts", by Pavlovs, Uploaded on Nov. 25, 2019, available at https://www.youtube.com/watch?v=zQohpgZHmVI, 11 pages.

* cited by examiner

SMART INTERACTIONS FOR A DIGITAL DUPLICATE

CROSS-REFERENCE TO RELATED APPLICATIONS

This application is a continuation of, and claims the benefit of priority under 35 U.S.C. § 120 to, U.S. application Ser. No. 17/337,261, filed on Jun. 2, 2021 and titled "Smart Interactions for a Digital Duplicate," which is a continuation of U.S. application Ser. No. 16/876,024, filed on May 16, 2020 and titled "Smart Interactions for a Digital Duplicate," the contents of each of which are incorporated by reference herein in its entirety.

The contents of commonly-owned U.S. application Ser. No. 16/425,886, filed on May 29, 2019 and titled "Digital Duplicate" are hereby incorporated by reference herein for all purposes.

BACKGROUND

Businesses and other networks have a fundamental need to derive an understanding of their business/network at any moment in time, in order to engage in strategic & operational decision-making.

OVERVIEW

Today, this need to understand your business is served by a range of conventional systems for storing, manipulating, and accessing data. Such systems are generally limited in their scope, flexibility, and ability to integrate with other such systems that exist within a business or across multiple businesses.

Part of this limitation arises from these conventional systems for storing, manipulating, and accessing data being built around specific business functions. As examples, such systems may include a CRM tool, inventory management system, accounting system, enterprise resource planning, payroll tool, among other examples. These systems further suffer from being confined to engaging in specific user functions (e.g., report generation and visualization, data input, etc.) that are associated with those business functions.

Further, "data warehousing" and "business intelligence" systems tend to consume data originating from various sources in a data network, and aggregate and pre-process that data to fit a predefined schema or set of dimensions. As a tool, data warehousing is rigid by virtue of the fact that the dimensions, metrics, aggregation, and delivery models (e.g., dashboards) for the data must be pre-defined prior to utilization. In addition, the data contained within such systems may also be used for the specialized simulation and modeling of specific (narrow) areas of the business (e.g., supply chain modeling, manufacturing planning, financial modeling & forecasting, etc.).

Conventional systems—such as relational databases—are advantageous for vertical scaling (e.g., expanding a data table of 22 columns to billions of records), but tend to be rather limited in terms of horizontal linking and expansion across multiple tables.

In order to address these shortcomings, and to help improve upon these and other problems, the present disclosure seeks to reduce fixed relationships between data tables through the disclosed digital duplicate data structure, which utilizes a dynamic model and method that can be implemented through a plurality of techniques including dynamic entity relationships. This allows for the digital duplicate to ingest information, access data, and adapt to an organization's changes without the burden of redesigning the data system from the ground up, as may be required in conventional data structures and conventional approaches for implementing data storage systems and data structures.

From a user standpoint, conventional data structures and conventional approaches for implementing data storage systems may allow for data to be accessed in response to specific queries as permitted by the foundational design of database structures (e.g., based on requirements analysis and design, as used to design a relational database system). One drawback to this approach, however, is that in order to obtain a desired output from the data storage system (e.g., to obtain a desired query result), the user must have apriori knowledge of the architecture of the data storage system, including an understanding of the data structures utilized in the data storage system. With the approach disclosed herein, there are no such constraints. Indeed, the digital duplicate may replicate the real-world physical reality of the existence of associations between digital records (data) describing physical assets, events and other phenomena, and as such may be configured to provide to users desired outputs without requiring those users to have a priori knowledge of the data storage architecture.

In some respects, the disclosed approaches for establishing new data structures provide other advantages and efficiencies. As one example, relationships in the new data structures can be established using minimal additional logic. Further, data ingestion occurring from multiple data sources can, with the benefit of the present approach for establishing new data structures, result in data that is efficiently synthesized and arranged in the established data structure, helping to ensure it is consistent across an organization's entire data store. Additionally, once relationships between data are established, changes in any underlying data source (e.g., changes to the underlying data models or structure used by the data source) do not require changing the established relationships.

In one aspect, disclosed herein is a method that includes presenting a first visualization that includes at least a first widget, the first widget including visual indicators that represent respective portions of source data, receiving a selection of a first visual indicator included in the first widget, creating a filter based on the respective portion of source data represented by the selected first visual indicator, presenting a second visualization that includes at least a second widget, the second widget including visual indicators that represent respective portions of source data, and applying the filter to the second visualization such that the visual indicators of at least the second widget represent respective portions of the source data filtered according to the filter. this respect.

In another aspect, disclosed herein is a computing system that comprises at least one processor, a non-transitory computer-readable medium, and program instructions stored on the non-transitory computer-readable medium that are executable by the at least one processor to cause the computing system to carry out the operations disclosed herein, including but not limited to the operations of the foregoing method.

In yet another aspect, disclosed herein is a non-transitory computer-readable medium comprising program instructions that are executable to cause a computing system to carry out the operations disclosed herein, including but not limited to the operations of the foregoing method.

One of ordinary skill in the art will appreciate these as well as numerous other aspects in reading the following disclosure.

DETAILED DESCRIPTION

The following disclosure references the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

The present disclosure is generally directed to technology to build and navigate through a "digital duplicate" representing an organization's business operations that offers a unique set of advantages over conventional systems. Specifically, by building a digital duplicate using a new data structure based on the neuro-synaptic model through which humans combine and use information in the brain, the digital duplicate may facilitate a more efficient and dynamic means of storing, retrieving, searching, securing, navigating, and synthesizing the data associated with the business or other network.

When the digital duplicate is populated with the data (embodied as digital content), the digital duplicate may allow for the data to be contextualized in a way that benefits from the efficiencies realized by human cognition. Furthermore, the data may originate from a plurality of sources (e.g., conventional data stores or warehouses) and may be unified and/or aggregated from those distributed sources into the context provided by the digital duplicate.

The disclosed system may be built in network-form, making large-scale multidimensional nodes, associations, and properties of many different data sources and types lightweight in comparison with conventional systems. Notably, conventional systems, such as the semantic web, do not provide for associations to be formed automatically based on semantic alignment between two or more pieces of data. As disclosed, the present architecture employs a semantic data type, among other properties and property types, which allows for associations to be formed between different data from their shared semantic context, automatically, without the association having to be programmed into the system (as it may otherwise be in existing systems, such as those that utilize "triplet" form, like OWL, RDF, etc.). Accordingly, the present disclosure provides a technique that invention allows for rules, logic and associations to be established and utilized around stored data without the need for programmatic logic.

In addition, the introduction of the semantic data type allows for semantically-identical information to be correlated even when different language is used by different users across a network or networks to describe that same information. This ability to correlate information by its semantics enables a wealth of novel functionality relating to data consumption, processing, association, manipulation and use, among others.

I. EXAMPLE SYSTEM ARCHITECTURE

Figure 1A:
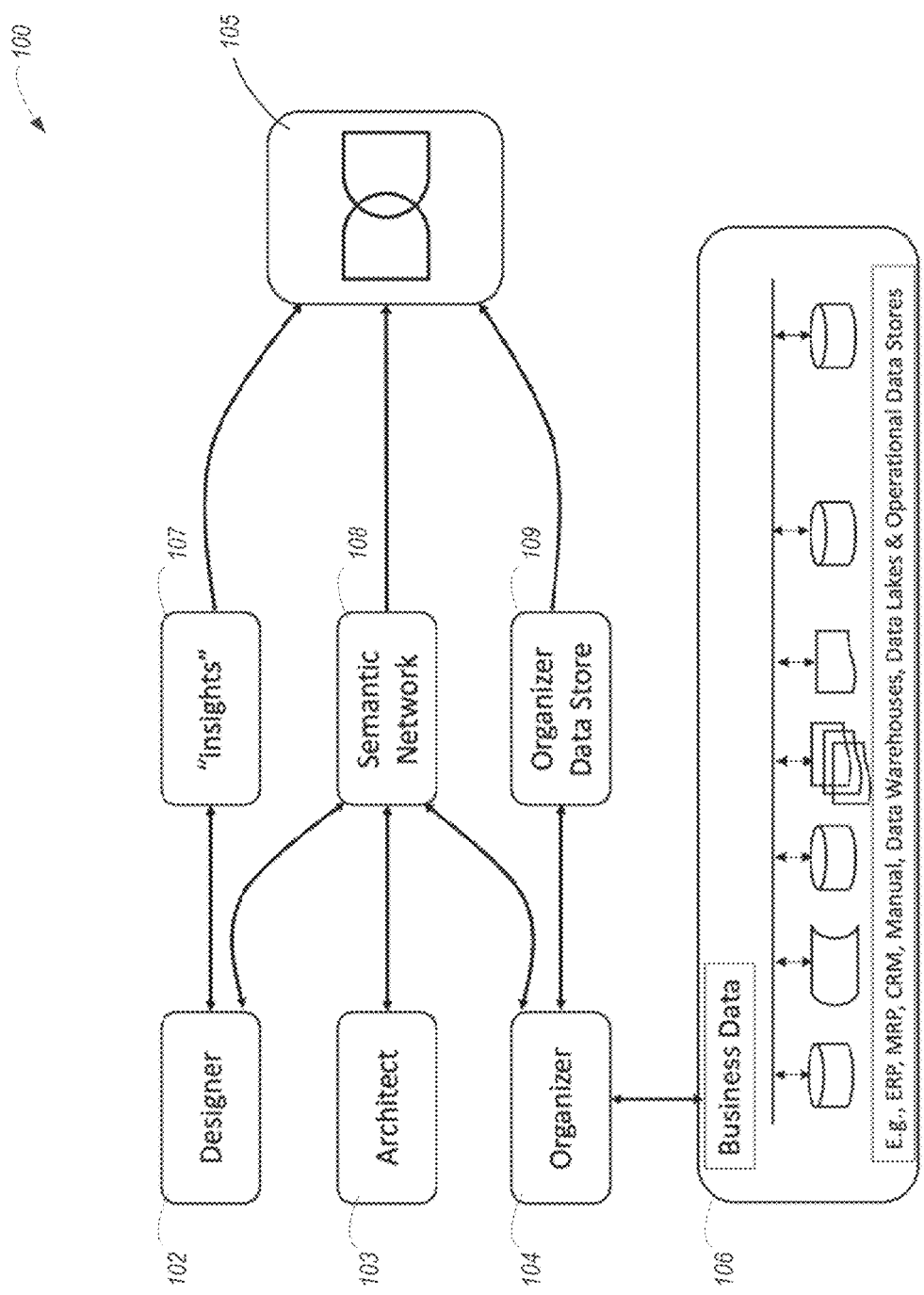
FIG. 1A depicts an example high-level functional arrangement in which example embodiments may be implemented.

Turning now to the figures, FIG. 1A depicts a high-level arrangement 100 of some of the functional components that may be involved in establishing and navigating through various aspects of a digital duplicate. In one example, three different tools may be used to establish and navigate through various parts of a digital duplicate 105, namely a designer tool 102, an architect tool 103, and an organizer tool 104, among other possible tools. At a high level, the architect tool 103 may be used to establish what is referred to herein as a "digital context," which can be thought of as the framework that replicates the language of a business. More particularly, but still by way of example, the architect tool 103 may be used to establish a "semantic network" 108 that relates the terminology and conceptual meanings behind the data collected and stored by an organization, such as various terms, metrics, key performance indicators, etc. that will be used within the digital replica of the business. As will be described further herein, the semantic network 108 may be a dynamic network of various data structures that are linked together, which replaces the typical relational data model of rows and columns contained within disparate databases, which provides cross-functional visibility. A semantic network 108 may comprise nodes, links, and properties that represent core-business elements, and is the foundation of the digital context.

A designer tool 102 may be used to introduce business logic into the semantic network by creating "insights" 107 that traverse the network through one or more "pathways." The insights 107 may then be used as a basis for information and visualizations provided to end users in one or more forms. The insights 107 may be created at the semantic level, and may thus be abstracted away from underlying source data 106.

An organizer tool 104 may be used to make a connection between the semantic network 108 and the organization's underlying data stores 106 (which, as depicted, may span across multiple disparate traditional databases or other data warehouses). This functionality may, in some embodiments, include functionality to link multiple data sources to the semantic network 108, as well as onboard the underlying data from the organization's underlying data stores 106 to the organizer data store 109 and ultimately into the semantic network 108 after filtering, cleaning, transforming, and/or validating the data as desired. These actions may serve to provide the system with what is referred to as "digital content," which together with the "digital context" form what is referred to as a "digital duplicate." The functionality that may be embodied in an organizer tool is described further herein. In some examples, the organizer tool is embodied as a software tool and is configured to be executed by the example system architecture described further herein below.

Figure 1B:
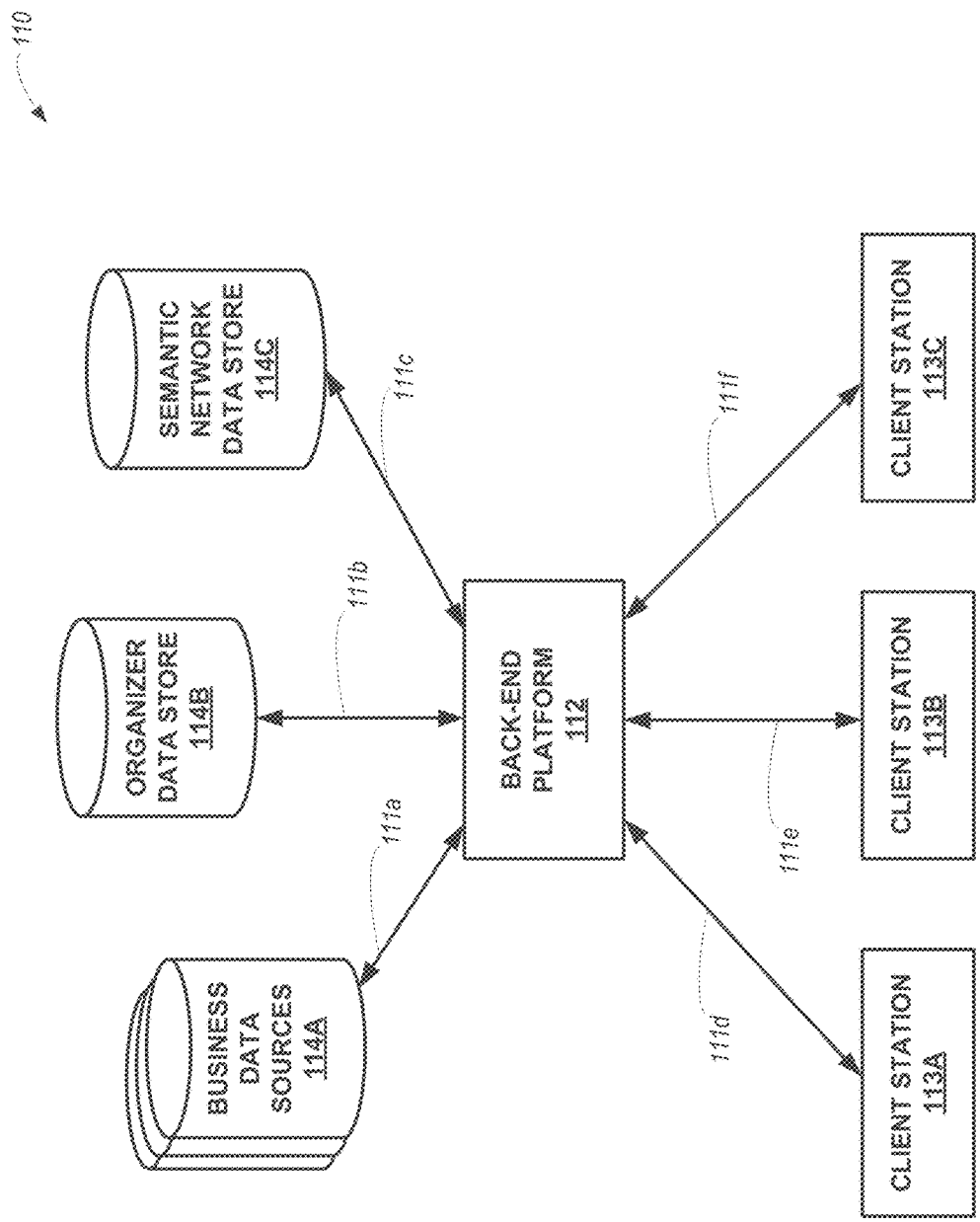
FIG. 1B depicts an example network architecture in which example embodiments may be implemented.

Turning now to FIG. 1B, depicted herein is an example network configuration 110 in which example embodiments of the present disclosure may be implemented. As shown in FIG. 1*i*, network configuration 110 includes a back-end platform 112 that may be communicatively coupled to one or more client stations, depicted here, for the sake of discussion, as client stations 113A, 113B, and 113C (collectively, client stations 113A-C).

Broadly speaking, back-end platform 112 may comprise one or more computing systems that have been provisioned with software for carrying out one or more of the functions disclosed herein, including but not limited to establishing a digital context, ingesting data to form a digital duplicate, presenting visualizations of portions of the data from the digital duplicate and enabling users to visually navigate through the data from the digital duplicate. The one or more computing systems of back-end platform 112 may take various forms and be arranged in various manners.

For instance, as one possibility, back-end platform 112 may comprise a computing infrastructure of a public, private, and/or hybrid cloud (e.g., computing and/or storage clusters) that has been provisioned with software for carrying out one or more of the functions disclosed herein. In this respect, an entity that owns and operates back-end platform 112 may either supply its own cloud infrastructure or may obtain the cloud infrastructure from a third-party provider of "on demand" computing resources, such as Amazon Web Services (AWS) or the like. As another possibility, back-end platform 112 may comprise one or more dedicated servers that have been provisioned with software for carrying out one or more of the functions disclosed herein. Other implementations of back-end platform 112 are possible as well.

In turn, client stations 113A-C may each be any computing device that is capable of running the front-end software disclosed herein. In this respect, client stations 113A-C may each include hardware components such as a processor, data storage, a user interface, and a network interface, among others, as well as software components that facilitate the client station's ability to run the front-end software disclosed herein (e.g., operating system software, web browser software, etc.). As representative examples, client stations 113A-C may each take the form of a desktop computer, a laptop, a netbook, a tablet, a smartphone, and/or a personal digital assistant (PDA), among other possibilities.

As further depicted in FIG. 1B, back-end platform 112 is configured to interact with client stations 113A-C over respective communication paths 111*d*, 111*e*, 111*f* (collectively communication paths 111*d-f*. In this respect, each communication path 111*d-f* between back-end platform 112 and one of client stations 113A-C may generally comprise one or more communication networks and/or communications links, which may take any of various forms. For instance, each respective communication path 111*d-f* with back-end platform 112 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path 111*d-f* with back-end platform 112 may be wireless, wired, or some combination thereof, and may carry data according to any of various different communication protocols. Although not shown, the respective communication paths 111*d-f* between client stations 113A-C and back-end platform 112 may also include one or more intermediate systems. For example, it is possible that back-end platform 112 may communicate with a given client station 113A-C via one or more intermediary systems, such as a host server (not shown). Many other configurations are also possible.

The interaction between client stations 113A-C and back-end platform 112 may take various forms. As one possibility, client stations 113A-C may send certain user input related to a digital duplicate to back-end platform 112, which may in turn trigger back-end platform 112 to take one or more actions based on the user input. As another possibility, client stations 113A-C may send a request to back-end platform 112 for certain data and/or a certain front-end software module, and client stations 113A-C may then receive digital duplicate data (and perhaps related instructions) from back-end platform 112 in response to such a request. As yet another possibility, back-end platform 112 may be configured to "push" certain types of digital duplicate data to client stations 113A-C, in which case client stations 113A-C may receive digital duplicate data (and perhaps related instructions) from back-end platform 112 in this manner. As still another possibility, back-end platform 112 may be configured to make certain types of digital duplicate data available via an API, a service, or the like, in which case client stations 113A-C may receive data from back-end platform 112 by accessing such an API or subscribing to such a service. The interaction between client stations 113A-C and back-end platform 112 may take various other forms as well.

As also shown in FIG. 1B, back-end platform 112 may also be configured to communicate with one or more data sources 114A-C, such as external databases, internal databases, and/or another back-end platform or platforms. Such data sources—and the data output by such data sources—may take various forms. Further, back-end platform 112 and the one or more external data sources 114A-C may be configured to interact over a communication path 111a, which may take the form or forms discussed above with respect to the other communication paths 111d-f.

It should be understood that network configuration 110 is one example of a network configuration in which embodiments described herein may be implemented. Numerous other arrangements are possible and contemplated herein. For instance, other network configurations may include additional components not pictured and/or more or less of the pictured components.

II. EXAMPLE COMPUTING DEVICE

Figure 2:
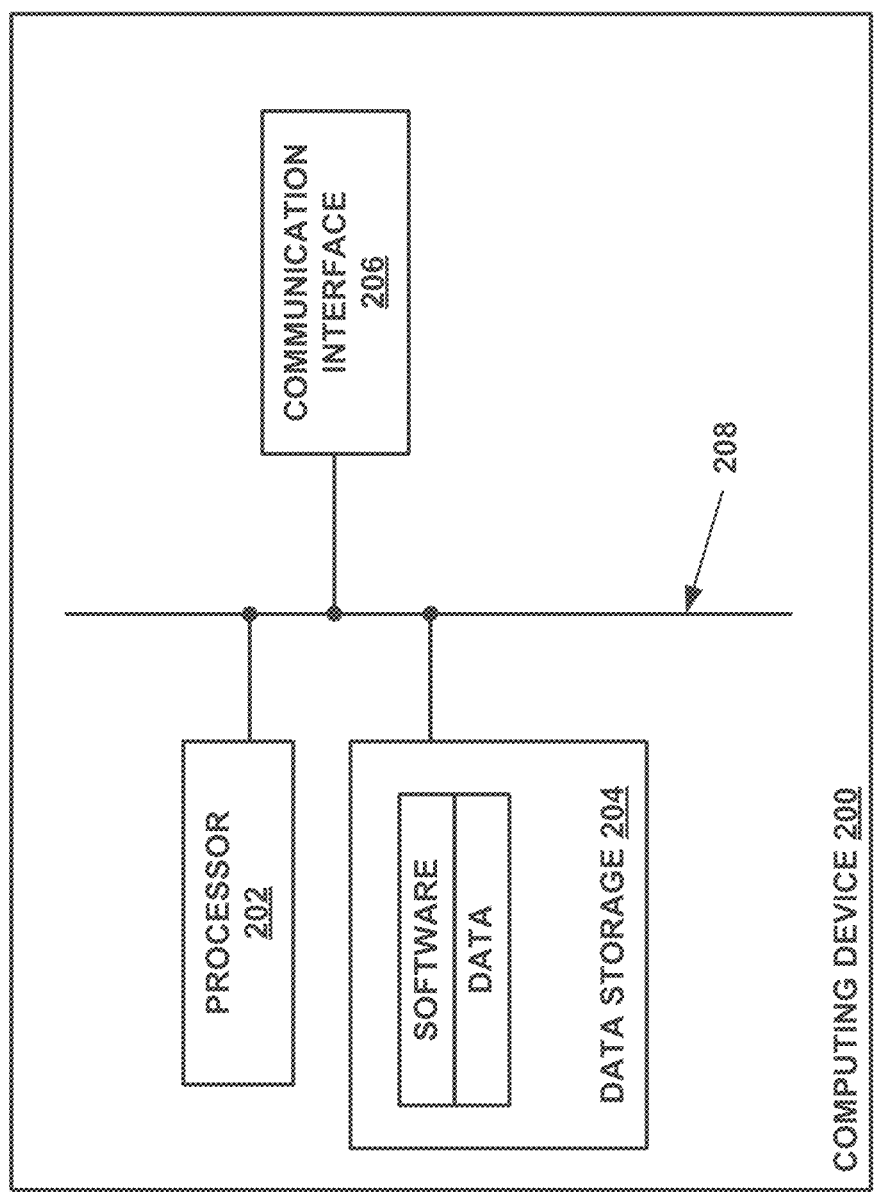
FIG. 2 depicts a simplified block diagram of an example computing device in which example embodiments may be implemented.

FIG. 2 is a simplified block diagram illustrating some structural components that may be included in an example computing device 200, which could serve as, for instance, the back-end platform 112 and/or one or more of client stations 113A-C in FIG. 1B. In line with the discussion above, computing device 200 may generally include at least a processor 202, data storage 204, and a communication interface 206, all of which may be communicatively linked by a communication link 208 that may take the form of a system bus or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud.

As shown in FIG. 2, data storage 204 may be provisioned with software components that enable the computing device 200 to carry out the operations disclosed herein. These software components may generally take the form of program instructions that are executable by the processor 202 to carry out the disclosed functions, which may be arranged together into software applications, virtual machines, software development kits, toolsets, or the like, all of which are referred to herein as a software tool or software tools. Further, data storage 204 may be arranged to store data in one or more databases, file systems, or the like. Data storage 204 may take other forms and/or store data in other manners as well.

Communication interface 206 may be configured to facilitate wireless and/or wired communication with other computing devices or systems, such as one or more client stations 113A-C when computing device 200 serves as back-end platform 112, or as back-end platform 112 when computing device 200 serves as one of client stations 113A-C. As such, communication interface 206 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, computing device 200 may additionally include one or more other interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with computing device 200.

It should be understood that computing device 200 is one example of a computing device that may be used with the embodiments described herein. Numerous other arrangements are possible and contemplated herein. For instance, other computing devices may include additional components not pictured and/or more or fewer of the pictured components.

III. DIGITAL DUPLICATE DATA STRUCTURES

As mentioned, the present disclosure is directed to a new approach for structuring an organization's, a business's, or a network's data as well as processes for creating and displaying visualizations that help visualize portions of the data from the digital duplicate, all of which may help to facilitate more efficient access to this data. At a high level, this approach involves establishing a digital context and populating the digital context with digital content to thereby form what is referred to herein as a digital duplicate. Deploying a digital duplicate in practice includes the high-level steps of first creating the digital context, and second adding data to this digital context. The digital duplicate may be kept live or refreshed repeatedly over time by continuously updating the digital context as the organization's, business's, or network's data changes and the digital content as the data and the data sources change. While elements of the digital context and digital content may change, the core data structure of the digital duplicate does not typically change, allowing the information flow to remain consistent without having to change the design of the data structure.

Figure 3:
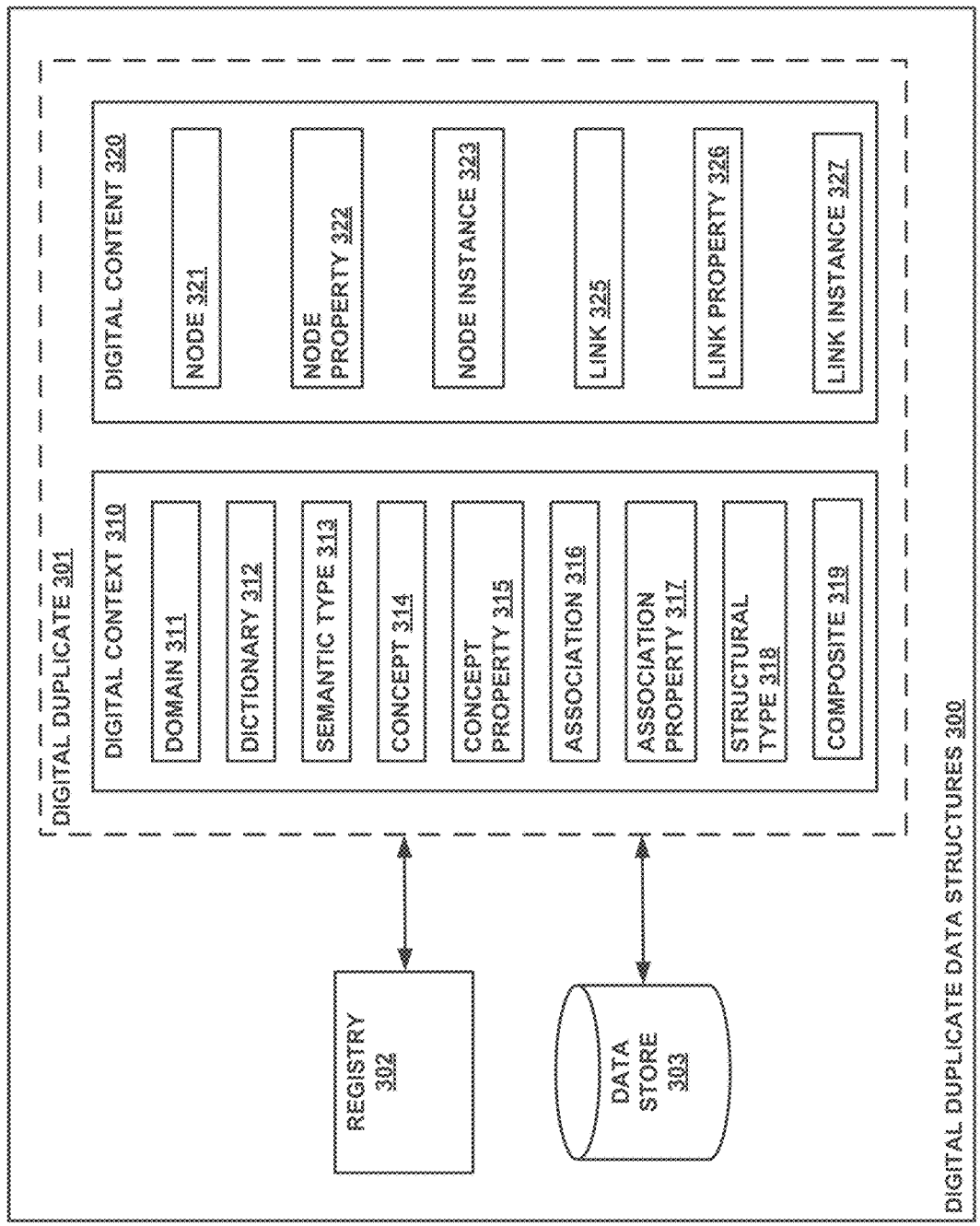
FIG. 3 depicts a simplified block diagram of some example data structures according to example embodiments.

FIG. 3 is a simplified block diagram, illustrating an example digital duplicate data structure architecture 300 according to an example embodiment of the present disclosure. At a high level, and as depicted, digital duplicate data structures 300 may include a digital context 310 and digital content 320, which together form what is referred to herein as an instance of a digital duplicate 301. The data structures 300 also include a registry 302 and a data store 303. These various data structures are described herein in further detail.

A. Digital Context

At a more specific level, but still by way of example, FIG. 3 depicts an example architecture diagram illustrating certain data structures included within digital context 310. As mentioned, digital context 310 is a data structure that generally comprises a network of individual data components. This network of data components may include structural context components and semantic context components. These components may be stored in data store as will be described further herein.

Turning first to the structural context components, these structural context components may generally describe how the data is structured and stored in the digital context. In one implementation, the structural context components may include conceptual components 314 (sometimes referred to herein as concepts) and associative components 316 (sometimes referred to herein as associations). And these components may have one or more respective properties 315, 317. These components may be designed to hold data that describes various aspects about how an organization's information is structured within the digital duplicate 301 as well as how this information relates to itself. Although these components are depicted as blocks in a simplified block diagram, it should be understood that the underlying data represented by these blocks may be stored in an appropriate storage location of data store 303, which may at time be referred to herein as a directory.

A conceptual component 314 may generally be a data structure that is designed to hold data that describes one aspect of an organization's business. To illustrate with an example for a particular organization in the medical services industry, one example conceptual component may be a "physician" component where this conceptual component may be designed to hold data that describes the physicians that are employed by the particular organization. To this end, the "physician" conceptual component may include various properties 315 for holding such data, including a "Last Name" property, a "First Name" property, a "Specialty" property, a "Telephone Number" property, and/or a "Years in Service" property, among other examples.

In some cases, properties may be shared across multiple conceptual components. For example, the "specialty" property may be shared across multiple "Physician" conceptual components and/or the "Clinic" conceptual component. In situations in which a property is widely shared across multiple conceptual components, the digital context may be configured to promote the "specialty" property from a property to a separate concept. This may be accomplished without changing the underlying data structure but rather reconfiguring it. This ability of the neuro-semantic network to adapt and learn as the organization changes makes it a scalable and learning model. The method provides for the ability to promote properties into concepts or to collapse them into concepts and associations to best represent the current structure of the organization.

Another example conceptual component 314 may be a "patient" component where this conceptual component may be designed to hold data that describes the individuals that are patients of the various physicians who are employed by the particular organization. To this end, the "patient" conceptual component may include various properties 315 for holding such data, including a "Last Name" property, a "First Name" property, a "Home Address" property, and/or a "preferred Payment Method" property, among other examples.

Yet another example conceptual component 314 may be a "clinic" component where this conceptual component may be designed to hold data that describes the various clinical facilities utilized by the particular organization. To this end, the "clinic" conceptual component may include various properties 315 for holding such data, including a "Clinic Name" property, an "Address" property, a "Services Offered" property, and/or a "Capacity" property, among other examples.

As depicted, another type of structural component of the digital context may be an associative component 316. An associative component is similar to a structural component in that it is designed to hold data that describes one aspect of an organization's business. But more specifically, the associative component is also designed to hold data that (i) describes an aspect of the organization's business such as an activity or a metric and (ii) relates together to two or more conceptual components 314. As an example, one example associative component for the particular organization in the medical services industry may be a "visit" component designed to hold data that describes a particular patient's visit to a particular physician at a particular clinic and is thus associative of multiple conceptual components, including the example "physician," "patient," and "clinic" structural components described above. To this end, the "visit" associative component may include various properties 317, including a "Date of Visit" property, a "Duration of Visit" property, "Billed Value of Visit," and/or a "Diagnosis of Visit" property, among other examples.

As mentioned throughout the examples given above, structural context components, including both conceptual components and associative components, include various properties 315, 317 for holding certain specific descriptive data for the structural context component. In some implementations, each individual property of a given structural context component may be described by a particular combination of a structural data type 318 and a semantic data type 313, which may thus form a semantic component.

Generally, a structural data type 318 applied to information is data that describes how the information is stored within the system. Many different structural data types are possible. As one example, a structural data type may take the form of a "temporal" data type, under which a "Years in Service" property may fall. As another example, a structural data type may take the form of a "spatial" data type, under which a "Clinic Address" property may fall. As another example, a structural data type may take the form of a "physical" data type, under which a "Clinic" and the "Clinic Name" property may fall. As another example, a structural data type may take the form of a "Personal" data type, under which a "Last Name" data type may fall. As another example, a structural data type may take the form of a "Quantitative" data type, under which a "Billed Value of Visit" property may fall. As another example, a structural data type may take the form of a "Categorical" data type, under which a "Specialty" property may fall. It should be appreciated that other examples may be possible as well.

Generally, a structural data type helps define how data is managed, indexed, and stored for all similar properties in the network. Properties with common structural data type may use common data structures to store and retrieve data across a digital duplicate and provide an efficient way to store, access and relate data; allowing for unique computations; and provide better methods to access, resolve and compare similar data. For example, all "temporal" data types may share or "index" to a common timeline data structure that allows independent events like a sale event and a marketing discount that happened during the same month without having to explicitly compare data. This provides an ability to not only perform unique computations and analysis on properties with similar structural data like "same month," or "same quarter," but also compare financial results of two unrelated companies for the same quarter even though they belong to different business networks because they use the same temporal data type. In another case, if two separate networks provide the population and economic data for the same spatial data type (such as a zip code), it allows one to overlay and contrast population and GDP for the same zip code with minimal effort. Multiple similar storage and advantages can be added to across all shared structural data types by creating a shared structural data type and storage model across properties in a network.

Structural data types like "temporal," "spatial," "personal," or "organizational" may allow data and methods to be shared across one or more properties in a network or across whole networks using a common data structure like a shared timeline, time resolution, or temporal methods; while semantic data types (discussed below) allows for data and methods to be shared across a network using common meaning. Shared structural data types may also have shared resolution and absolute values. For instance, "February 2015" will have a resolution of 1 day and may be a delivery date to a customer or the start date of an employee. This allows shared computations like "Start Month" or "Delivery Month" to be performed.

As also indicated, each property may also have a semantic data type 313. Generally, a semantic data type applied to underlying information is data that describes what the information means. A semantic data type may have various aspects that facilitate describing what the information means. One aspect that a semantic data type may have is called a primitive data type. A primitive data type may describe the general form of the information. Example primitive data types may include "integer," "Boolean," "string," "float," etc. Another aspect that a semantic data type may have is a pointer that points to a particular function that may be associated with the information. This pointer may be stored in the dictionary entry 312 for the particular semantic data type and may point to various kinds of functionality. As one example, the pointer may point to a web method for utilizing the underlying information. A web method may be any operation or set of operations embodied in a web service, API, or the like. For instance, one web method may be a "mailto:EmailAddress" web method that refers to a web method that causes an email client to be invoked, generate a new email message, and populate the "To:" field with the email address represented by the data variable "EmailAddress." Other web methods are possible as well.

Another example of a function to which a pointer may point is mathematical operation performed using the underlying information represented by the semantic data type. For instance, one type of mathematical operation for a "date of birth" semantic data type may be an age computation function. With such a function, the system may compute the age of an individual represented by the underlying date of birth information by, for instance subtracting the "date of birth" date from "current date" data to arrive at "age" data.

Another type of mathematical function for a "price per unit" semantic data type may be a total price aggregation function. With such a function, the system may aggregate all of the data values from various "price per unit" data types to arrive a total price value. Such a function may be useful in situations where a customer is purchasing products or services in a single order that stems from two or more aspects of a business, which may not have aggregated their data systems in advance. Applying the "price per unit" semantic data type (or, in other examples, a similar-functioning semantic data type) serves to link the pricing across what may be disparate aspects of the organization and/or disparate data systems.

Another type of mathematical function for a "lead time" semantic data type may be a lead time aggregation function.

A "lead time" semantic data type may be associated with a product, component of a product, subassembly, construction project, etc. With such a function, when a customer purchases multiple products at once, an aggregation function may be executed in which the system may automatically populate "lead time" data by selecting the individual lead time field for each of the purchased products that has the greatest lead time value. In cases in which a product may not have a lead time associated with it, the lead time of each subassembly or component that makes up the product may by summed to approximate the total lead time of the product.

In one example, during data ingestion, the system may capture various data fields for an order, including a "deliveryDate" field for describing the delivery date of an order, an "orderDate" field for describing the date of the placement of the order, and a "delivery Time" field for describing the time taken for the order to be fulfilled after the product is fully manufactured and stocked in inventory, all of which may be specified by various a logistics or fulfillment systems. At this stage, the system may compute the actual lead time of the product to be the function of (deliveryDate —orderDate) —deliveryTime. Therefore, in the case where a product is not built before it is ordered (as is common in the heavy equipment industry, for example) lead time may be a residual value, as calculated above. Once lead time is known, the system may then engage in a function that compares the actual lead time with the approximated lead time, which may be made possible by the existence the "lead time" semantic data type being used across multiple business systems that is semantically distinct from a "delivery time" type. A further function may add an "error" to the function for computation of approximated lead times for all other products, which in turn may propagate the new calculation of approximated lead times throughout the digital duplicate instantaneously. In this way, the system may engage in a kind of machine learning.

Another example of a function to which a pointer may point is a linking function that may operate to link two or more semantic data types together and form a new property of an associative structural component. As one example of this, a distance function may link together an "address" property of a "patient" conceptual component and an "address" property of a "clinic" conceptual component and computes the distance between these two addresses. The function may then save this distance as a new property of a new associative component.

Yet another example of a function to which a pointer may point is a semantic search function. With such a function, a search may be executed on a given semantic data type, which may retrieve data of the same semantic type from other areas of the organization or other network.

To help illustrate, consider an example in which respective digital duplicates have been established for different aspects of an organization. Each such digital duplicate will have its own set of data components stored separately from the data components of the other digital duplicates. In a situation in which a user desires to know all employees that share duties or interact across the organization's departments, a semantic query can be issued on an "Employee" semantic data type. In the context of the present disclosure, such a semantic search may return all data objects that are based on this semantic type, regardless of the content, format, or location of the data. In this way, the semantic search unifies various disconnected digital representations. With conventional approaches, by contrast, a typical search would fail here, because the data may be spread out across multiple different databases and arranged in multiple tables;

and as such, any query would need to account for these multiple databases and the various tables.

Considering another example, say a user desires to know all entities (e.g., dealers, customers, vendors, employees, etc.) having a specific area code. In the context of the present disclosure, the user could issue a single query on a "Phone No." data type for the specific area code of interest. Such a query would return all data objects having the specific area code of interest no matter the location or format of the data. By contrast, with a conventional approach, a user may need a deep understanding of the organization's data storage structure in order to carry out this query. For instance, the user may need to know what table the employee records are stored in and what field and what format the phone number data is stored in. Likewise, the user may need to know this same information for the dealer records, the customer records, the vendor records, etc. Each additional storage location may add complexity to the query. And to the extent that the data is stored in disparate data stores (such as one data warehouse for employee records and another data warehouse for vendor records), then the user may need to issue separate queries for each such disparate data source further compounding the complexity and vulnerability for user error. Thus, with the benefit of the present disclosure, it should be understood how the semantic data type provides for more efficient data retrieval, among other advantages.

In some embodiments, user interface elements presented by one or more computing devices disclosed herein (e.g., client stations 113A-C) may reflect semantic data types with specific graphical elements, such as icons. As one example, on a user interface that is displaying multiple semantic data types for an organization, the user interface may display a telephone icon adjacent to data that is of a "phone number" semantic data type, and/or a map icon if the data is of an "address" semantic data type, although other examples are possible. It should be understood that the functions disclosed herein are merely examples, and that in other implementations, other functions may be possible as well.

Depending on the organization, semantic data types can be arranged into various semantic groups. A semantic group is generally a set of one or more semantic data types that are relevant to a particular categorical aspect of the organization. For instance, example semantic groups for an organization may be "Financial & Accounting," "Production & Manufacturing," "Purchasing," and/or "Logistics." In this way, an organization may arrange the semantic data types into groups that are reflective of the organization's operating departments or sectors. Thus, the "Financial & Accounting," semantic group may have semantic data types that refer to aspects of the organization's own financial & accounting department, the "Production & Manufacturing," semantic group may have semantic data types that refer to the aspects of the organization's own production and manufacturing operations, etc. As such, these semantic data types may more accurately describe the organization's own business operations and may thus be more useful to the organization.

Semantic data types may provide various advantages to organizations who utilize the digital duplicate schema set forth in FIG. 3 and generally described herein. As one advantage, the semantic data type 313 may serve to discriminate between (i) human language used to describe an aspect of the organization's operations (which can be stored as the name of a property, in one embodiment) and (ii) the underlying meaning of the human language used to describe the aspect of the organization's operations (which can be stored as the semantic data type, in one embodiment). This discrimination may thus allow for properties in the digital duplicate to be unified by their underlying meaning (i.e., unified by their semantic data type) even when the human language used to describe them (i.e., their property names) may not be the same.

More particularly, but still by way of example, the digital duplicate architecture 300 encourages this unification by having data sets that are consistently accurate and complete because no data is mismatched within a given context. To illustrate, if one property is called "Digits," and another property is called "Phone No." but these properties refer to the same thing, they both may be pulled into a report, a visualization, a computation, or used in some other way by the computing system when the digital duplicate calls for the semantic data type 'Telephone Number' within a given context. This may be accomplished through an arrangement where "Telephone Number" is a semantic data type that is shared by both the "Digits" and "Phone No." properties. In this way, the semantic data type may be said to "unify" two (or more) properties by these properties' underlying meanings.

Unification may also allow for functions to be associated with different properties of the same semantic data type. To illustrate, as indicated above, "Digits" and "Phone No." may be two different properties that share the same semantic data type "Telephone Number." Therefore, both "Digits" and "Phone No." may have a pointer that points to a "Make-Call" function, which is assigned to these properties by virtue of their shared semantic data type.

Unification may also occur by enriching the structural context of the digital duplicate as a result of automating through-computation of additional properties based on the semantic data type(s) of the original properties and the functions available for the semantic data type(s) (i.e., employing one or more transformations, as will be described further herein). To illustrate using the example from above, the function for computing "Age" from the "Date of Birth" semantic data type is a form of unification because "Birth Date" and "Date of Birth" may be distinct properties in the digital duplicate but share the same semantic data type: "Date of Birth." Other examples of how the digital duplicate architecture results in unification are possible as well. The combination of the concept (node) or association (link) that describes a property in combination with a semantic data type (and in many cases a structural data type) individually and combined also create a strong representation of the digital context. When combined, they provide not only a simple way to locate every piece of data in the business network, and to locate a relative position of the data to other pieces of data for navigation and comparison, but also may provide meaning to the data and structure for storage. Once combined, these data structures create ways to simply and efficiently create, manage, and navigate data in a business or network using the digital context.

As also depicted in FIG. 3, digital context 310 may contain a composite structure 319. A composite structure 319 may contain one or more indications of sets of concepts and associations that represent various aspects of an organization. One type of composite structure may be a layer of concepts and associations. The concepts and associations that comprise a layer may represent similar aspects of the organization. In one example, an organization in the medical services industry may have a "pharmaceutical" layer that comprises concepts and associations related to any pharmaceutical aspects of the organization, such as pharmacy employees, pharmacy inventories, and/or an employee layer that comprises concepts and associations related to employees across all departments. Another type of composite structure may be a realm of concepts and associations. The concepts and associations that comprise a realm may represent aspects of the organization that are grouped on a broader level. For instance, a large organization that is made up of or owns several smaller businesses may have a realm that comprises all the concepts and associations for one entire business and a realm that comprises all the concepts and associations for another entire business. Yet another type of composite structure may be an insight. The concepts and associations that comprise an insight may represent collections of concepts and insights that have been automatically identified by the system as having some threshold number of relationships. The system may identify such insights when certain patterns develop in the organization's digital context (e.g., a threshold number of associations between various concepts, and/or a threshold number of shared properties between multiple concepts or associations), and thus may identify to users unique aspects of the organization's operations. Other examples of layers, realms, and insights are possible as are other types of composite structures.

B. Digital Content

As also depicted in FIG. 3, the digital duplicate 301 includes digital content 320. Generally, digital content 320 is the underlying data that populates one or more instances of the framework for the digital duplicate (i.e., the digital context 310) described above. Such digital content may comprise data that may be ingested into the system (in accordance with, perhaps, the functionality associated with the organizer software tool described further herein below) from one or more data sources, such as business systems (e.g. CRM systems, ERP systems, POS systems, accounting software, etc.), enterprise data stores, data warehouses, data lakes, operational data stores, as well as any other type of kind of databases or data store, such as data inputted by a user, data mined from research reports, among other examples.

This underlying data may be either static data, data updated in a batched manner, such as on a periodic or aperiodic refresh cycle, or data updated in real-time or near real-time (e.g., data provided to the system in the form of a data "stream", which may or may not be buffered to align with the update frequency of the Digital Duplicate's data ingestion method). Other examples of data ingestion may be possible as well.

As depicted, digital content may generally be comprised of links and nodes. In particular digital content 320 may include node data 321, node properties 322, and node instances 323. Further, digital content 320 may also include link data 325, link properties 326, and link instances 327.

As a general matter, node data 321 and link data 325 may include underlying instances of an organization's information that populates a digital context schema, examples of which have been described above. Node data 321 in particular may include the underlying information that populates the conceptual components of the digital context. Referring back to the examples described above, one example conceptual component may be a "physician" component where this conceptual component may be designed to hold data that describes the physicians that are employed by a particular medical services organization. Node data 321 may thus include underlying organization information for the "physician" component, such as individual instances 323 of particular physician information. Thus, for each instance of information that populates the "physician" conceptual component, node data 321 may include a corresponding node. The underlying information within each respective node may be arranged into node properties 322 in accordance with the property structure defined by the conceptual component. For instance, one "physician" node may include node property data "Smith" for the "Last Name" property of the conceptual component, "John" for the "First Name" property of the conceptual component, "Pediatrics" for the "Specialty" property of the conceptual component, "555-867-5309" for the "Telephone Number" property of the conceptual component, and "30" for the "Years in Service" property of the conceptual component, although other examples are possible.

Similarly, link data 325 may include the underlying information that populates the associative components of the digital context. Referring back to the examples described above, one example associative component may be a "visit" component where this associative component may be designed to hold data that describes a particular patient's visit to a particular physician at a particular clinic. Link data 325 may thus include underlying organization information for the "visit" component, such as individual instances 327 of particular visit information. Thus, for each instance of information that populates the "visit" associative component, link data 325 may include a corresponding link. The underlying information within each respective link may be arranged into link properties 326 in accordance with the property structure defined by the associative component. For instance, one "visit" link may include link property data "Jan. 2, 2020" for the "Visit Date" property of the associative component, "1 hour" for the "Duration of Visit" property of the associative component, and "$110" for the "Billed Value" property of the conceptual component, although other examples are possible.

C. Storage Schema

The network of individual data components described above may be stored in one or more data stores 303 in various ways. The structure of the digital context and well as the storage schema, as described herein, allows for network traversal as well as semantic searches (described above) while querying for data. As a result of traversal of the "data network," subsets of the data can be efficiently retrieved and presented to one or more users. Data stores 303 may take the form of one or more of SQL Server, Oracle, Mongo DB, or other storage technologies.

As one example of the various ways in which the individual data components may be stored in data stores 303, relationships between conceptual components 314 and associative components 316 may be stored using what are referred to as unique identifiers ("UIDs"). In this way, each element of each instance of the digital duplicate 301 may have an associated UID (which, depending on the situation, may or may not be unique). As outlined above, the various elements that may have a UID assigned thereto may be (i) domains, (ii) subdomains, (iii) directories, (iv) conceptual components, (v) associative components, (vi) properties, (vii) dictionaries, (viii) semantic groups, and/or (ix) semantic data types. In some implementation, a UID may take the form of a URI (Uniform Resource Identifier), or any other standard identifier type, among other examples.

As an illustrative example the "Patient" conceptual component may exist in data storage 303 in, for instance, table form with underlying digital data populated for the component in the form of [P1, P2, P3, etc.]. Likewise, the "Physicians" conceptual component may exist in data storage 303 in, for instance, table form with underlying digital data populated for the component in the form of [H1, H2, H3, etc.]. Likewise, the "Clinics" conceptual component may exist in data storage in table form with underlying digital data populated for the component in the form of [C1, C2, C3, etc.].

Using this arrangement, the "Visits" associative component may accordingly exist in data storage 303 in, for instance, table form with underlying digital data populated for the associative component in the form of a table containing intersecting data from the other related conceptual components. As an example, one specific instance of the "Visit" component may have data that takes the form [P1, H3, C2], where this instance describes a visit that took place by patient "P1" who was treated by physician "H3" at clinic "C3," although other combinations are be possible.

Reciprocal data tables may be stored in data storage 303 as well. A reciprocal table may serve to identify, for the conceptual component data, whether and to what extent there is associative component data that relates in some way to the conceptual component data. Using the examples set forth above, the "Patient" conceptual component discussed above may contain a reciprocal table that intersects its dependent structural components for each instance of a "Patient," where one instance for Patient "P1" may take the form of [V1, H3, C2]. Other examples of reciprocal tables may be possible as well.

In this way, the data defining the schema for the digital duplicate may be embodied as a "data network" or form of neurosynaptic storage of information, where associative information (such as that described above) is stored at the intersection point of the structural components. Each instance of such data tables for corresponding "Visits," "Patients," "Physicians," and "Clinics" (as examples) may be created from source data by an organizer part of the data ingestion method, described below. This provides certain advantages over traditional data storage models, such as relational models that use fixed relationships between data. As one advantage, the present technique uses a single, atomic template to implement each structural association and its corresponding components in the appropriate storage model. As such, this technique allows for dynamic expansion to create as many associations as may be desired to represent the desired comprehensive network. In comparison to NoSQL databases that store entities as collection of key-value pairs and allow for each record to have a variable structure in each table, or graph databases that use key-value pairs to store relationships between two values, the digital duplicate architecture allows information to be stored within a flexible neurosynaptic data structure to describe the data using the directory, dictionary, and the structural data types. This provides dramatic flexibility both to store and locate data accurately and to capture additional business information within the network.

Further, the data defining the schema for the digital duplicate can be stored in data storage 303 via tables that represent all relationships that comprise the network of components (referred to herein as the "Digital Context" 301). And in this way, data ingested can be placed within this digital context 301. In some implementations, this technique may provide for traceability between data sources and its corresponding data context using UIDs for each source of data and for each contextual element. As an example of this, a patient's "First Name" data element may reference the UID of the structural elements corresponding to this data element (for example, the patient's associated visits) and vice-versa.

The system may be further configured to store a particular digital context 310 and/or the underlying digital content 320 for the particular digital context with an indication that the particular digital context and/or the underlying digital content belongs to unique domain 311 or subdomain. For instance, a unique domain (and/or subdomain) may be established for each instance of the digital duplicate and may be stored in a registry 302. A registry 302 may contain (a) a list of domains and (b) a list of all subdomains that exist within each domain. For instance, returning to the example organization in the medical services industry, the list of domains may contain a domain indicator (e.g., a URI) that is specific to this organization. The domain indicator may thus represent all the data that is stored as the digital content for a digital duplicate related to this organization. Within each domain, there may be one or more subdomains for individual data contexts for the organization. For instance, within the domain for the example organization, in the medical services industry, there may be a subdomain for "Purchasing," and a subdomain for "Marketing," among other examples. This, the list of subdomains may contain subdomain indicators (e.g., URIs) that identify these subdomains.

A registry 302 may also contain data describing locations and identifiers of authentication security services for users accessing data within a given domain. For instance, domains and subdomains may be private (accessible only to users within an organization), and as such may contain such authentication data that serves to describes the various user that have appropriate permissions to access the given domains and/or subdomains. Domains and subdomains may also be public, and therefore accessible to any users or systems outside of an organization. Other examples of data that may be stored in the registry are possible as well.

As explained, the schema for one instance of a digital context may be stored in or with what is referred to as a "dictionary" 312. In this way, a single dictionary 312 may store data that describes the digital context 310 for one specific organization. The system may thus store multiple dictionaries, with one dictionary being stored for each specific organization that utilizes the system to create and store an instance of a digital duplicate 301. In some implementations, however, dictionaries may be shared between domains and/or subdomains. For instance, if a first organization in the medical services industry has already established a dictionary that stores its schema data describing its digital context, then a second similar medical services organization may benefit from using this same dictionary already established for the first organization. In this way, a common set of semantics may be used across organizations in the same or similar industries.

The digital duplicate may be stored via data store 303 using any appropriate data storage technology, including by way of example, graphical databases, relational databases (SQL, Oracle), in-memory data storage, as well as other types of storage. Digital duplicate information may be stored in two or more such database technologies for redundancy and/or performance purposes.

In some implementations an index file may be used as a separation of concerns measure. For instance, an index file that may contain data keys may reside in one location and the digital duplicate data may reside in another, perhaps remote, location. In this way, a set of semantic services may be employed to store and retrieve data specific to the underlying digital duplicate data by first accessing the data keys and then using those data keys to identify and access the location of the underlying digital duplicate data.

IV. EXAMPLE NAVIGATION TOOL OPERATIONS

As mentioned above, a navigation tool (which may be embodied by a software tool running on a computing device)

may be used to create and navigate through visualizations of the organization's data as embodied in the digital duplicate, where this process is at times herein referred to as engaging in "smart interactions." At a high level, smart interactions allow the user to visually and intuitively traverse the semantic network to dynamically provide on-demand visualization of the business data. Based on the traversal of the network, the network can be simplified and/or subnetworks can be created. As part of the visualization, "perspectives" can be created based on focal points (i.e., nodes) in the network. The focal points may be used as a starting point for the traversal, and functions (e.g., aggregates) can be dynamically applied to produce subnetworks to provide data for visualization.

As a general matter, and as used herein, a visualization may comprise a graphical representation that is presented to a user via a graphical user interface on a computing device. It should be understood that, as described herein, the function of presenting a visualization includes, in some embodiments, sending, providing, or otherwise making available a set of instructions that operate to cause a client station to display the visualization.

In accordance with embodiments of the present disclosure, the disclosed navigation tool may be configured to present visualizations in the form of "perspectives" and "widgets." As used herein, a widget comprises any discrete visual representation of a set of related data typically involving one or more properties from the digital duplicate. A widget generally has a particular format, with examples including line graphs, bar charts, pie charts, doughnut charts, or tables, to name a few. As will be described herein further, one example widget may present a bar chart visualization depicting an organization's revenue by month for a particular year. Another example widget may present a pie chart visualization depicting percentage revenue attributable to particular stores in a given region. Other examples may be possible as well. Generally, information that can be derived based on observing the widget may be referred to as an "insight."

Figure 4:
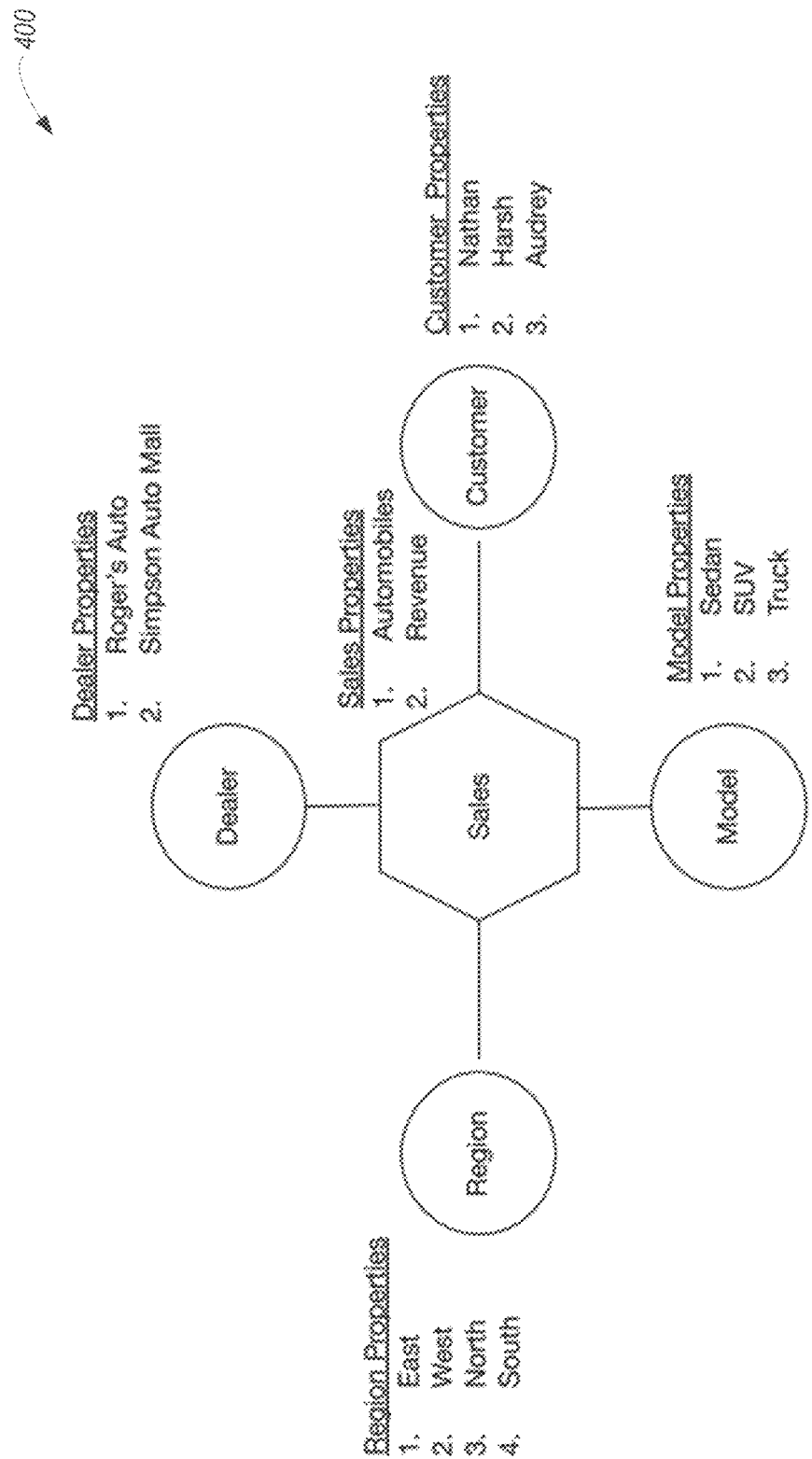
FIG. 4 is an example semantic network in which an example embodiments may be implemented.

As used herein, a perspective comprises a compilation of individual widgets, with each widget generally relating to the same or similar concepts. A perspective generally has what is referred to as a "focal point," which is a node from the digital duplicate about which each widget in the perspective presents data. To illustrate with reference to a simplified example semantic network, FIG. 4 depicts an example semantic network 400 that may represent an automobile sales organization. The network 400 includes four nodes: (i) a Region node with four properties (East, West, North, South), (ii) a Dealer node with two properties (Roger's Auto and Simpson Auto Mall), (iii) a Customer node with three properties (Nathan, Harsh, and Audrey), and (iv) a Model node with three properties (Sedan, SUV, and Truck). The network 400 also includes a Sales link with two properties (Automobiles and Revenue) that links to each of the four nodes. The depicted semantic network 400 is an example, and in practice, semantic networks may have many more nodes and/or links.

In accordance with the implementations described herein, a first perspective may be created using the Region node as the first perspective's focal point. The first perspective may include one or more widgets that visually represents data indicating the number of automobiles sold through the four regions (East, West, North, South). The one or more widgets may also include, for example, a widget that visually represents data indicating (i) the number of automobiles sold via each dealer (Roger's Auto, Simpson Auto Mall), (ii) the number of automobiles sold of each model (Sedan, SUV, and Truck), and/or (iii) the customers to which the automobiles were sold (Nathan, Harsh, Audrey), among other possible examples.

While this first perspective is being displayed, a user may desire to learn more information about the data in the network related to the East region, and so to get more information the user may select an indicator for the "East" region that may be presented on one of the widgets of the first perspective. This action may trigger the display of a second perspective that may include one or more different widgets that visually represent data indicating sales revenue for just the East region. In this example, a context filter has been enabled whereby all information presented via the widgets of the second perspective has been filtered to present only information related to the East region. In other words, while this context filter is active, the widgets included within the second perspective do not visually represent data indicating sales that took place in the North, South, or West regions.

Continuing with this example, while the second perspective is being displayed, the user may desire to learn more information about a particular model of automobile that was sold throughout the East region. The user may select an indicator for "SUV" that may be presented in one of the widgets of the second perspective. This action may trigger the display of a third perspective that may include one or widgets that visually represent data indicting sales revenue for just the East region and for just SUV models. Other ways to navigate through the semantic network using perspectives and widgets may be possible as well.

Turning now to an example navigation tool, at a high level, the navigation tool may include functionality that enables a user to (i) create perspectives, (ii) create widgets, and (iii) interact with the perspectives and widgets in order to navigate through visualizations, change the data presented via the widgets, and thereby uncover insights about the organization. Example features and functionality that may be carried out by one or more computing devices running the disclosed navigation tool are discussed in detail below. For purposes of illustration only, these example operations are described as being carried out by a computing device, such as computing device 200 (FIG. 2), which as described above, may serve as one or more of client stations 113A-C (FIG. 1B) and/or back-end platform 112 (FIG. 1). In this respect, it should be understood that, depending on the implementation, the operations discussed herein below may be carried out entirely by a single computing device, such as one or more of client stations 113A-C or by back-end platform 112, or may be carried out by a combination of computing devices, with some operations being carried out by back-end platform 112 (such as computational processes and data-access operations) and other operations being carried out by one or more of client stations 113A-C (such as display operations and operations that receive user inputs). However, other arrangements are possible as well.

To help illustrate the example features and functionality of the disclosed navigation tool, reference will be made to an example workflow wherein a user may interact with the navigation tool in order to (i) create perspectives, (ii) create widgets, and (iii) interact with the perspectives and widgets in order to navigate through the visualizations. One such example workflow is depicted herein in the form of a flow diagram, which describes combinations of operations that may be performed by a computing device in accordance with one embodiment of the disclosed navigation software tool. In some cases, a block in a flow diagram may represent a module or portion of program code that includes instructions that are executable by a processor to implement specific logical functions or steps in a process. The program code may be stored on any type of computer-readable medium, such as non-transitory computer readable media (e.g., data storage 204 (FIG. 2)). In other cases, a block in a flow diagram may represent circuitry that is wired to perform specific logical functions or steps in a process. Moreover, the blocks shown in the flow diagrams may be rearranged into different orders, combined into fewer blocks, separated into additional blocks, and/or removed, based upon the particular embodiment. Flow diagrams may also be modified to include additional blocks that represent other functionality that is described expressly or implicitly elsewhere herein.

Figure 5:
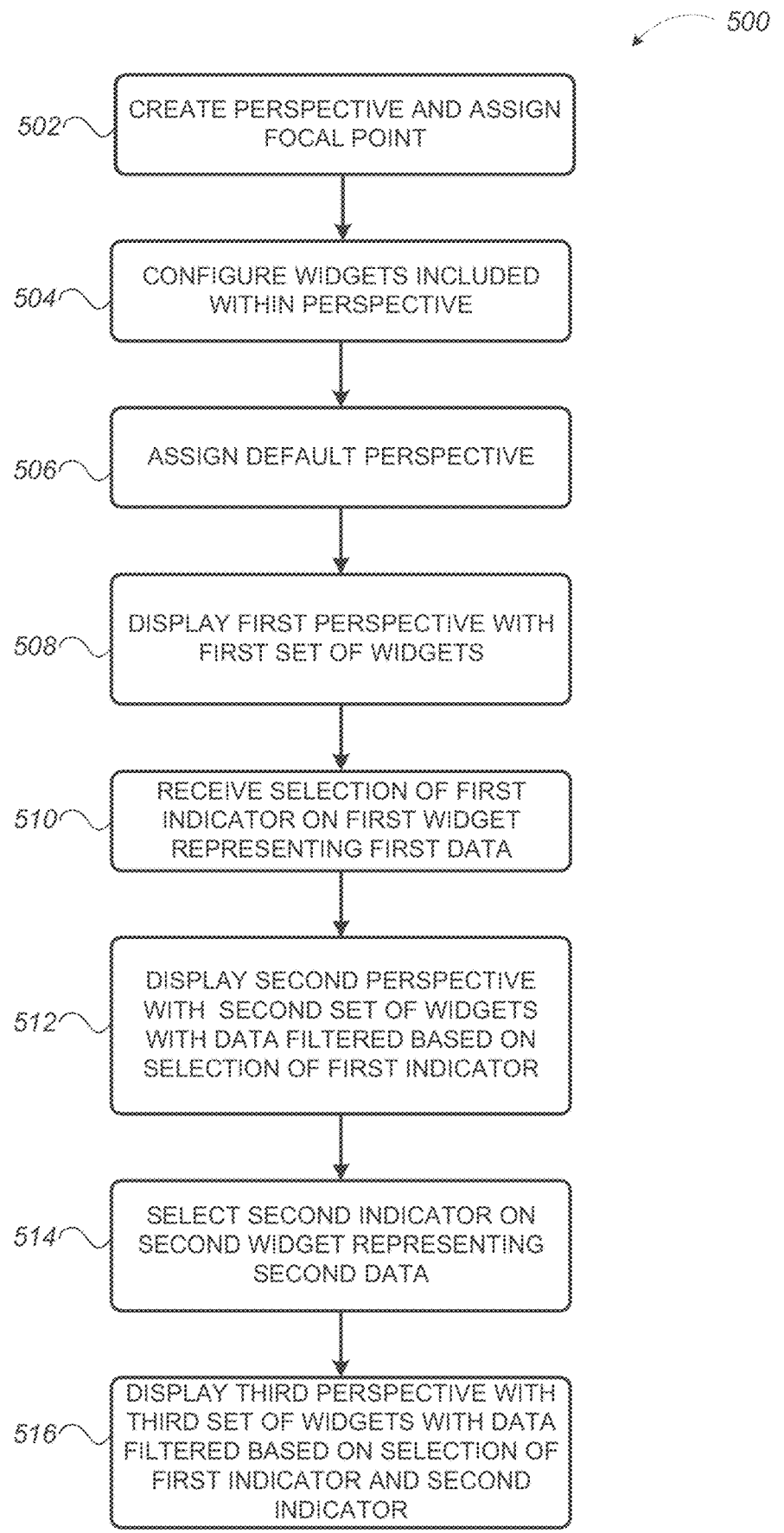
FIG. 5 is a flow diagram depicting example operations that may be carried out in accordance with one or more embodiments of the present disclosure.

With reference now to flow diagram 500 of FIG. 5, one example of a workflow carried out in accordance with the disclosed navigator software tool is illustrated and described. This process may generally involve the following operations: (i) at block 502, the computing device may create a perspective and assign a focal point, (ii) at block 504, the computing device may configure widgets included within the perspective, (iii) at block 506, the computing device may assign the perspective to be a default perspective, (iv) at block 508, the computing device may display the first perspective with a first set of widgets, (v) at block 510, the computing device may receive a selection of a first indicator on a first widget representing first data, (vi) at block 512, the computing device may display a second perspective and second set of widgets with data filtered based on the selection of the first indicator, (vii) at block 514, the computing device may receive a second selection of a second indicator on a second widget representing second data, and (viii) at block 516, the computing device may display a third perspective with a third set of widgets with data filtered based on the selection of the first indicator and second indicator. Each of these operations will now be discussed in further detail with reference, in some cases, to example interfaces that may facilitate some or all of the disclosed functionality.

Turning first to block 502, the computing device may begin the example workflow by creating a perspective and assigning a focal point. To facilitate this operation, the navigation software tool may present one or more interfaces (such as GUI screens) through which a user may provide various inputs in order to create the perspective and assign a focal point to the perspective.

Figure 6A:
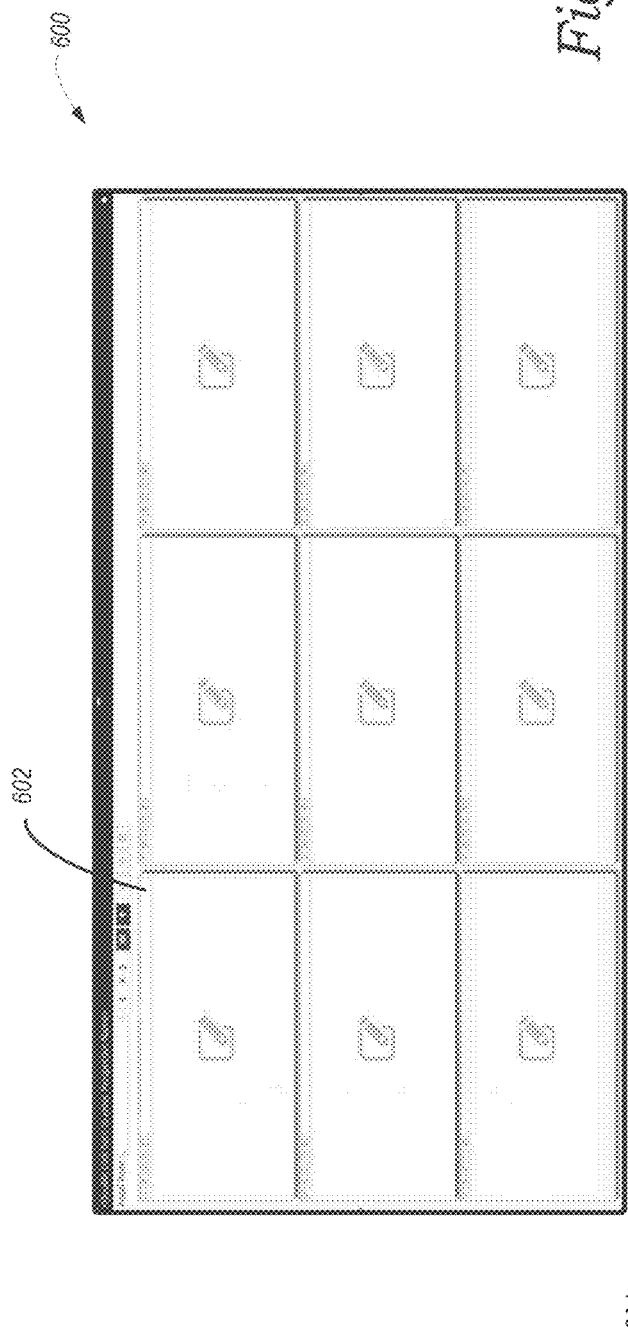
FIG. 6A is an example output produced by a device executing one embodiment of a software tool according to the present disclosure.
Figure 6B:
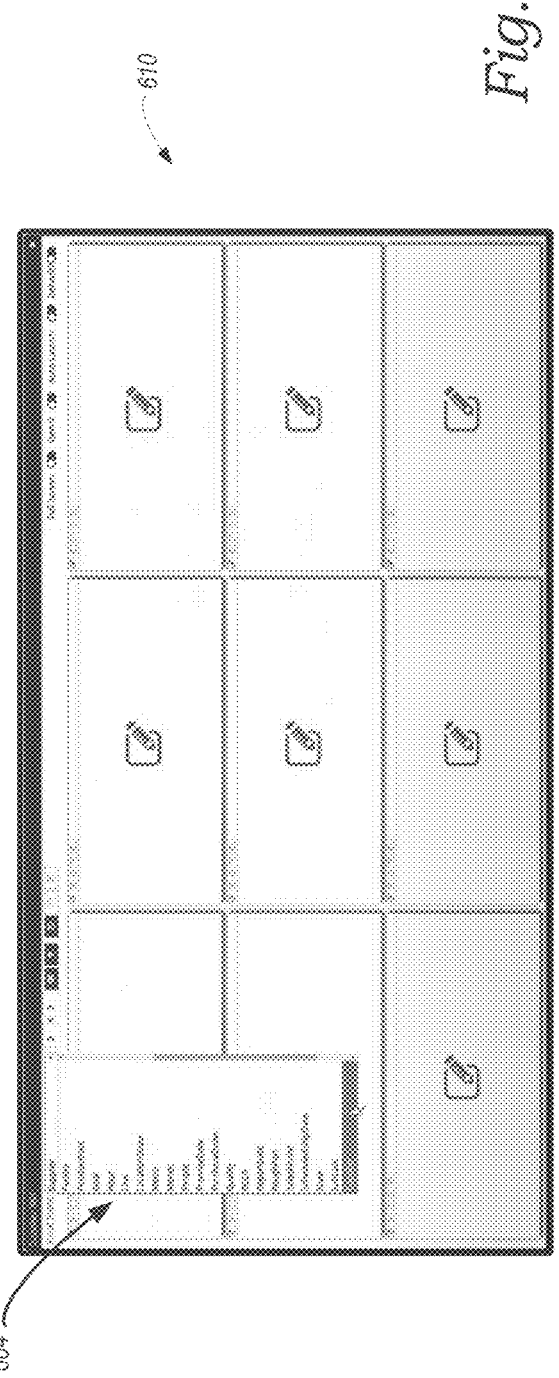
FIG. 6B is an example output produced by a device executing one embodiment of a software tool according to the present disclosure.

To illustrate one example of this, FIGS. 6A and 6B depict example interfaces 600 and 610 of a GUI that may be presented to a user in order to facilitate creating a perspective and assigning a focal point. Via interface 600, for instance, a user may provide various inputs in order to configure the perspective. For instance, a user may provide inputs indicating how many widgets 602 to include within the perspective. The interface may include a drop-down menu, such as drop-down menu 604 depicted in interface 610 that enables a user to select a node from the digital duplicate to assign as the focal point for the perspective. As depicted in interface 610, the user may select the "Supplier" node from among the list of all nodes available to the user. However, other nodes can be selected as the focal point in other examples as well.

Turning next to block 504, the computing device may configure the widgets to be included in the perspective. The computing device may do this in a variety of ways. As one possibility, the computing device may assign a data series to the widget. At a high level, assigning a data series may include identifying what portion of data from the underlying digital duplicate should be displayed or graphically represented by the format and the indicators of the widget. The computing device may assign a data series automatically with no user intervention or the computing device may prompt the user to provide various user inputs to instruct the computing device which data to use for the widget. In implementations in which the computing device automatically assigns a data series to the widget, the computing device may refer to the focal point and use this focal point to identify a second node to which the focal point is linked and then automatically assign one or more data series that represent one or more of the data related to the focal point and the second node to which the focal point is linked.

In implementations in which the computing device receives user inputs to facilitate assigning data series, the user may provide such user inputs to the computing device via interface 600 or 610 (or another type of interface) in order to define what data to use for the widget. In this respect, a user may click or select a widget template, such as widget template 602, which may cause the computing device to display additional interfaces through which the user may provide inputs to define what data to use for the widget. One such interface may comprise a graphical representation of the nodes and links that comprise the digital duplicate and are accessible to the user, from which the user could select one or more nodes or links or one or more portions of source data that have been populated into the displayed nodes and links in order to identify that source data as the data that should be displayed by the given widget. As will be explained further herein, the nodes and links that are accessible to the user may comprise a subset of the nodes and links that comprise the entire digital duplicate. Nodes and links that are accessible to a user may be based on certain permissions associated with the user (e.g., where there permissions define which nodes and links should be hidden or inaccessible to the user and which nodes and links should be visible or accessible to the user). Additionally or alternatively, the computing device may display the source data in a tabular form, such that a user may select portions of a table in order to identify that source data as the data that should be displayed by the given widget. Other ways to assign a data series to a widget may be possible as well.

As another possibility, the computing device may assign a format to the widget. The format of a widget generally refers to the graphical manner in which the widget represents the data series to which it has been assigned. Examples of formats that may be assigned to a widget include line graphs, bar charts, pie charts, doughnut charts, or tables, to name a few. In order to assign a format to a widget, the computing device may assign a format automatically with no user intervention or the computing device may prompt the user to provide various user inputs to instruct the computing device which format to use for the widget. In implementations in which the computing device automatically assigns a format to the widget, the computing device may refer to the focal point or the data series assigned to the widget in order to identify a logical format to use to represent this data. For instance if the data series assigned to the widget is related to money over some timer period (e.g., revenue or sales per month over some number of years), then the computing device may determine that the bar chart or a line graph is the most logical format to use for the given widget.

In implementations in which the computing device receives user inputs to facilitate assigning a format, the user may provide such user inputs to the computing device via interface 600 or 610 (or another type of interface) in order to define the various aspects of the format. In this respect, a user may click or select a widget template, such as widget template 602, which may cause the computing device to display additional interfaces through which the user may provide inputs to define the various aspects of the format assigned to the widget. One such interface may comprise a menu from which the user can select from among various types of formats and may provide additional inputs in order to customize the format, such as specifying what colors to use for certain data series, what the scale should be for certain graphs, as well as other types of inputs to define other aspects of the format.

In some implementations the user may provide inputs via an interface at this stage in order to apply transformations or filters to the data that will be displayed by the widget. For instance, the user may desire that a widget display data in a manner in which it is not stored in the underlying digital duplicate. Accordingly, the user may specify that the computing device should apply a transformation to the data before displaying the data via the widget. For example, revenue data may be stored in the underlying digital duplicate in a "per month" format. The user could provide a user input at this stage that instructs the computing device to apply a transformation that rolls up this revenue data into quarters. Accordingly, the widget would combine the revenue data into three-month periods and display it via the widget even though revenue data is not stored in three-month periods in the underlying digital duplicate. Many other types of transformations are possible as well.

As mentioned, the user may also instruct the computing device at this stage to apply one or more filters to the data before displaying the data via the widget. For instance, if a given widget is assigned to display monthly revenue, it may be desirable to limit the time period over which the widget displays data to just the three most recent years, rather than the entire history of the organization. The user may via an appropriate interface provide user inputs in order to instruct the computing device to apply a filter before displaying the data via the widget. Many other different types of filters may be possible as well.

In some implementations, the user may provide inputs via an interface at this stage in order to assign the given widget to a default perspective for a particular category of data. For instance, a widget may be assigned to a default perspective for a particular category (i.e., x-axis) or data series of the widget, meaning that if this particular category or data series is used to drill down for another view, then the given widget will be shown as part of the perspective selected to show this data.

As a general matter, the process for creating a perspective, creating widgets that comprise the perspective, and configuring the widgets may result in the creation or generation of a set of program instructions (or other pseudocode) that define the configuration and visual appearance of the perspective and the widgets. These program instruction (or other pseudocode) may be stored in one of the aforementioned data stores 114A-C.

In some respects, the process for creating a perspective, creating widgets that comprise the perspective, and configuring the widgets may utilize what is sometimes referred to as a "low-code" or "no-code" methodology. In a no-code methodology, a user may utilize the disclosed software tool to create a perspective and/or widget without having to manually provide any program code (or pseudocode). In this respect, the disclosed software tool may facilitate the computing device's receipt of user inputs (other than program code or pseudocode), such as user input selections of various GUI elements or other non-code user text inputs, from which the disclosed software tool may use to automatically establish the program code defining the perspective or widget. Similarly, in a low-code methodology, a user may utilize the disclosed software tool to create some portions of a perspective or widget without having to manually provide any program code (or pseudocode), but may ultimately provide (or have the option to provide) some program code (or pseudocode) input to customize or otherwise finalize the perspective or widget. In either respect, the disclosed software tool may function to, upon receiving various user inputs, establish program code that defines the configuration and visual appearance of the perspective or widget including, by way of example, (i) what data is assigned to the widget, (ii) what graphical format to use to represent the assigned data, and/or (iii) what, if any, transformations or filters to apply to the assigned data before displaying it via the widget. The program code established by the disclosed software tool may take the form of a JSON script, although other types of program code are possible. The disclosed software tool may be utilized with other methodologies as well.

Figure 7:
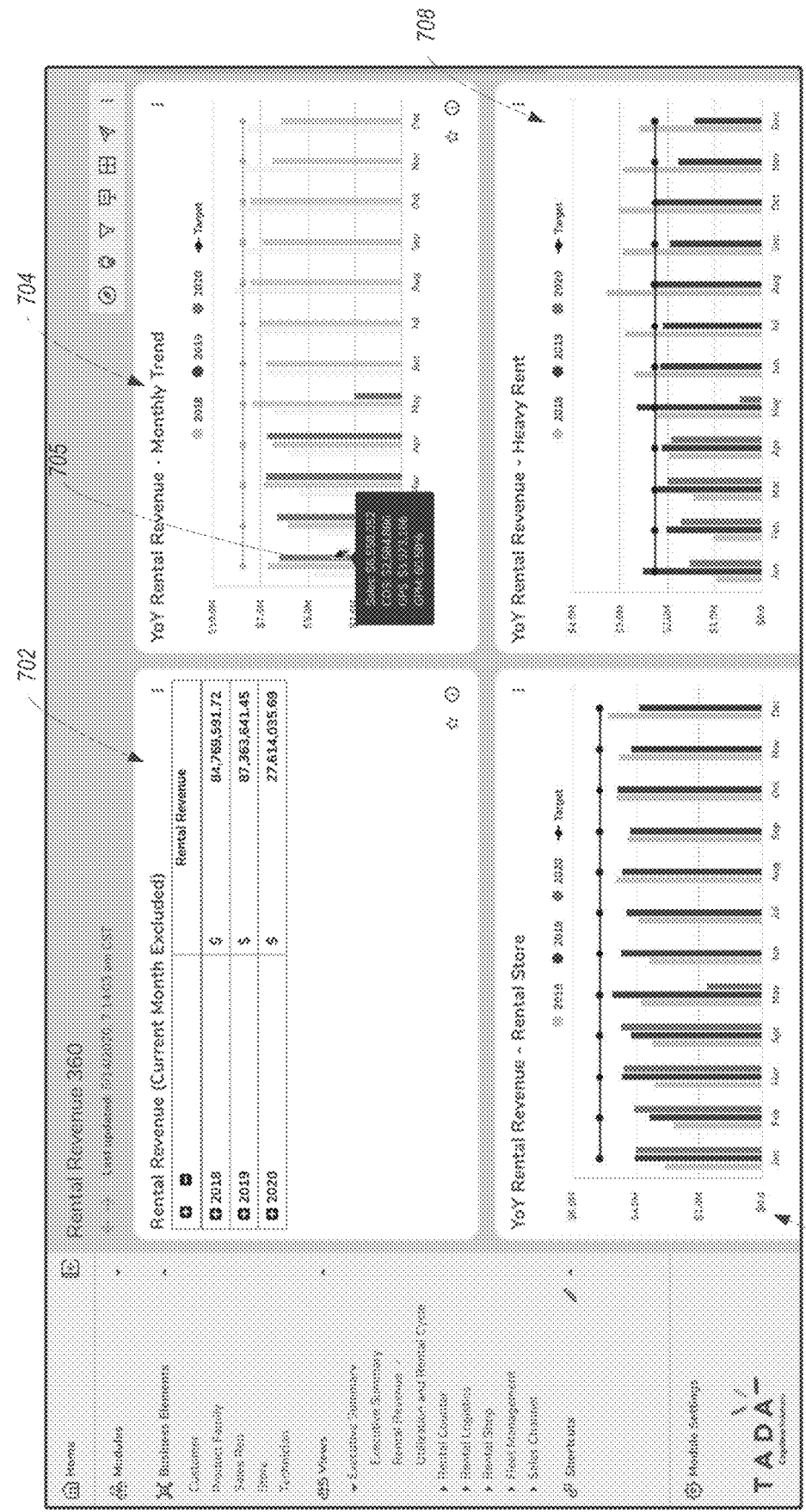
FIG. 7 is an example output produced by a device executing one embodiment of a software tool according to the present disclosure.

To help illustrate some example data series and formats of widgets that may be possible in the context of the disclosed navigation tool, FIG. 7 depicts an example interface 700 that includes an example perspective related to "rental revenue" with four example widgets 702, 704, 706, and 708 for an example organization. In this example, the corresponding digital duplicate for this organization may have a "rental revenue" or a "rental transaction" node or link, which may be selected as the focal point node for this perspective. The digital duplicate may also contain "store" and "rental equipment" nodes, which may be linked to the "rental revenue" focal point node. In accordance with one example implementation of assigning formats and data series for a widget, the computing device may assign to a first widget a data series that includes revenue per year generated as a result of rental transactions, and may assign this widget to a table format. Widget 702 is one example of a widget that has been assigned a data series that includes revenue per year generated as a result of rental transactions and assigned to a table format.

In another example, the computing device may assign to a second widget a data series that includes yearly revenue broken out per month and may assign this widget to a bar chart format. Widget 704 is one example of a widget that has been assigned a data series that includes yearly revenue broken out per month and assigned to a bar chart format.

In yet another example, the computing device may assign to a third widget a data series that includes yearly revenue broken out per month for one particular store assigned to the "store" node, and may assign this widget to a bar chart format. Widget 706 is one example of a widget that has been assigned a data series that includes yearly revenue broken out per month for an example "CAT Rental Store," and assigned to a bar chart format.

And in still another example, the computing device may assign to a fourth widget a data series that includes yearly revenue broken out per month for one particular category of rental equipment assigned to the "rental equipment" node. Widget 708 is one example of a widget that has been assigned a data series that includes yearly revenue broken out per month, and assigned to a bar chart format. Additional widgets are possible as are widgets that have been assigned different data series and assigned to different formats.

Returning to FIG. 5, the computing device may next, at block 506, receive an input indicating that the perspective being created should be a "default" perspective for the given focal point node. As will be discussed further herein, a default perspective is a setting that indicates to the computing device which perspective to display first when a user requests data relating to a specific node. For instance, in some implementations, the disclosed navigation tool includes the ability to receive a user input, such as a click or other selection, of an indicator within a widget (e.g., an individual bar in a bar graph, an individual point in a line graph, or an individual segment on a pie or doughnut chart). In some embodiments, in response to receiving a click or other selection of an indicator within a widget, the computing device may display a new perspective. In order to determine which perspective to display without having to consult the user, the computing device may determine if there is a default perspective assigned to a node related to the data represented by the selected indicator. If so, then the computing device may display that default node. If not, then the computing device may display a perspective containing any widget that is formatted for display of data represented by the selected indicator or the computing device may prompt the user to select a perspective from among a list of existing perspectives or create a new perspective.

Next at block 508, the computing device may display a first perspective with a first set of widgets. Turning back to FIG. 7, interface 700 depicts an example first perspective with a first set of widgets 702, 704, 706 and 708. Each widget may include one or more indicators, each representing a set of data values related to the particular data series assigned to the widget. For instance, widget 704 may be assigned a data series that includes yearly revenue broken out per month and assigned to a bar chart format. When presented in a perspective by the computing device, widget 704 may contain several indicators that represent portions of the yearly revenue broken out per month. For instance, widget 704 may contain a first indicator in the form of a bar representing January revenue for year 2018, a second indicator in the form of a bar representing January revenue for year 2019, a third indicator in the form of a bar representing January revenue for year 2020, and so on. The indicators may be different colors so as to visually distinguish them. For instance, indicators representing data for a first year may be colored yellow, whereas indicators representing data for a second year may be colored blue, and indicators representing a third year may be colored red, although other colors are possible. The indicators may take different forms as well, depending on the format of the widget. Widget 704, for instance, has a bar chart format. Accordingly, the indicators for widget 704 take the form of bars. However, in widgets of other formats, the indicators may take on other forms, such as points, an individual point in a line graph, or an individual segment on a pie or doughnut chart, etc.

Further, although widgets and perspectives may be defined prior to when they are displayed, when the widgets and perspectives are displayed, the computing device accesses the semantic network at or around the time the computing devices displays the widgets and perspectives in order to present up-to-date data. In other words, perspectives and widgets may represent data that was not necessarily present within the underlying digital duplicate semantic network at the time the given perspective or widget was created. Such data may have been added to the network after the creation of the widget or perspective but because the computing device accesses the digital duplicate at or around the time the computing device displays the widget or perspective, any data added to the network in that interim will be included. Other ways to access and retrieve the underlying source data may be possible as well.

More particularly, each individual indictor on the widget 704 represents two values: a value from the x-axis and a value corresponding to the data series, or y-axis. In this example, the values from the x-axis correspond to months of the year (i.e., January, February, March, April, and so on), and the data series displayed correspond to years (i.e., 2018, 2019, 2020). As will be explained further, while the computing device is displaying the first perspective, the user may select the indictor corresponding to year 2020 and the month January. This selection may be used to navigate to a second perspective with a new focal point. In this example, the x-axis value (i.e., "Jan") and the associated network node (i.e., "month") together may be used by the computing device to determine the second perspective. In addition, because the indictor selected by the user also represented the year "2020," that value is carried forward as a context filter.

The computing device may operate to display additional information related to the data represented by a given indicator when a user hovers a curser or other software visual indicator over a second indicator on the screen. As depicted in interface 700, for instance, if a user has hovered a curser over a particular indicator related to revenue in widget 704, the computing device may present additional data related to revenue, such as (i) the precise amount of revenue represented by the indicator, (ii) the cost of sales represented by the indicator, (iii) the gross profit in dollars attributable to the revenue represented by the indicator, and/or (iv) the gross profit margin in percentage attributable to the revenue represented by the indicator, among other possibilities.

Continuing with the workflow in FIG. 5, next at block 510, the computing device may receive a selection of a particular indicator in a first widget. As depicted in interface 700 for instance, a user may click on or otherwise select indicator 705, which represents the January 2020 revenue. Once the computing device receives a selection of a particular indicator, the computing device may use the data represented by the particular indicator to create a drill-down filter and present additional widgets and/or perspectives based on this drill-down filter. Returning to the example depicted in FIG. 7, responsive to receiving a selection of, say, indicator 705, which represents the January 2020 revenue, the computing device may create a filter using the data represented by indicator 705, which is the month January, the year 2020, and revenue. This filter is at times referred to herein as a "running context," which the computing system continues to add to and responsively present perspectives and widgets that include data filtered according to the running context as the user clicks additional indicators in additional widgets. This is described by reference to block 512, 514, and 516 in the workflow depicted in FIG. 5.

For instance, moving next to block 512 in FIG. 5, in response to the computing device receiving a selection of the first indicator in the first widget, the computing device displays a second perspective with a second set of widgets with data filtered based on the selection of the first indicator. Continuing with the example depicted in FIG. 7, when the computing device receives a section of, say indicator 705 in widget 704, the computing device may determine that indicator 705 represents January 2020 revenue and may responsively create a filter using January, 2020, and revenue. The computing device may next determine whether to display a new perspective. The computing device may do this by determining whether there exists a default perspective for any nodes underlying the data represented by indicator 705. For instance, the computing device may determine whether a default perspective exists for "monthly revenue." If such a default perspective exists, the computing device may display this perspective.

If no such default perspective exists, then the computing device may dynamically create a perspective on the fly using widgets it considers most relevant to the data represented by the selected first indicator. In one example of this, a perspective may be dynamically created by the computing device based on the data series represented by the selected first indicator. In one example, if a user selected an indicator representing a "Month" category, the computing device may identify one or more widgets that have "month" as an assigned data series, and dynamically stitch together a new perspective using these identified widgets. In the case where a perspective is dynamically created, the computing device may present an interface through which the user could provide feedback (e.g., a "thumbs up" or "thumbs down" or the like) related to the dynamically created perspective. This feedback may be used by the computing device to filter out widgets that may have a relatively negative feedback the next time a user drills down on the particular category of data. The feedback may also be used to filter out widgets for other users as well.

Additionally or alternatively, the computing device may prompt the user to select a perspective to display from among a list of predefined perspectives or may give the user an option to create a new perspective on the spot.

Figure 8:
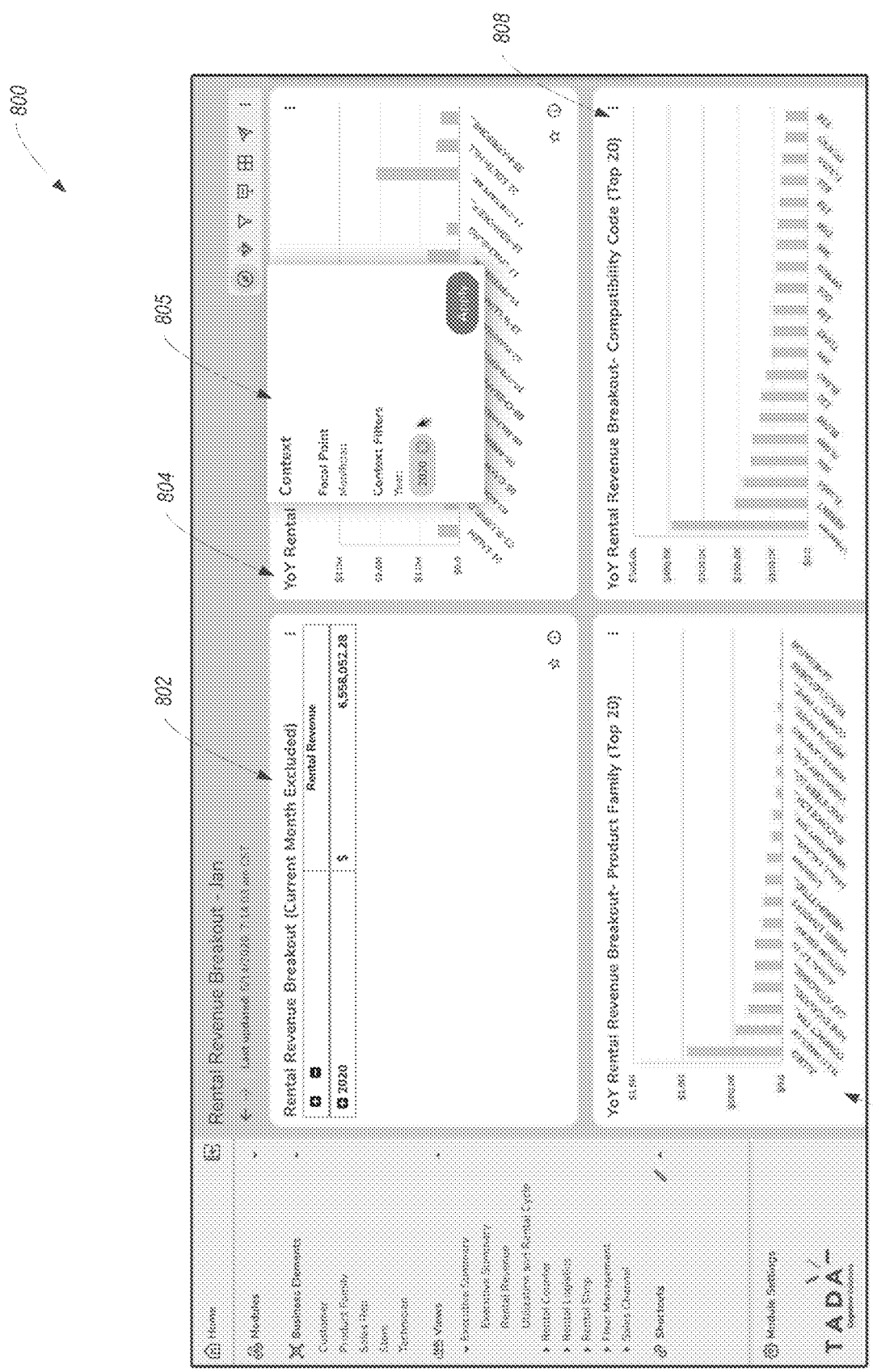
FIG. 8 is an example output produced by a device executing one embodiment of a software tool according to the present disclosure.

In the event the computing device determines to display a second perspective with a second set of widgets, the computing device may display this second perspective and second set of widgets and may cause the second set of widgets to filter, based on the running context, the data that may otherwise be displayed absent any running context. FIG. 8 for instance depicts an interface 800 displaying a second perspective with a second set of widgets 802, 804, 806, and 808. As depicted for instance, widget 802 is configured to display rental revenue per year, widget 804 is configured to display rental revenue by store, widget 806 is configured to display rental revenue by product family, and widget 808 is configured to display rental revenue by compatibility code, although other widgets may be configured to display other data. The second set of widgets may generally be configured to display as much data as the digital duplicate has, except in this example because the computing device previously received a selection of a first indicator in a first widget, the computing device causes the second set of widgets to filter the data they would otherwise display based on the running context. As depicted, the widgets 802, 804, 806, and 808 may only display data for the month of January 2020, which is the running context as depicted in module 805.

The user may modify the running context in various ways. As one possibility, to remove portions of the running context (and thus make the filter broader, which may cause the widgets to show more data) the user may hover over an individual filter and click or otherwise select the 'x' or the like in module 805. Responsively, the computing device may update the displayed perspective and the displayed widgets to cause them to display additional data that now falls into the broadened filter. For instance, if the user were to select the 'x' for the year "2020" then the computing device may update the running context to remove 2020 and would then cause the currently-displayed widgets to display data for January of all years (e.g., 2020, 2019, 2018, etc.). A further example of this is described with respect to FIG. 9B.

As another possibility, to add to the running context (and thus make the filter narrower, which may cause the widgets to show less data), the user may click or otherwise select another indicator of another widget. For instance, moving next to block 514, the computing device may receive a selection of a second indicator in a second widget. In interface 800 in FIG. 8, the user may, for instance, select an indicator in widget 806, such as the bar representing the "08—RICHMOND CONSTRUCTION" store. The selection is used to navigate to a third perspective with a new focal point. In this example, the x-axis value represented by the selected indicator (i.e., "08—RICHMOND CONSTRUCTION") and the associated node (i.e., "Store") together are used by the computing device to determine the third perspective. In addition, the previous focal point and context filter are carried forward as two context filters.

Figure 9A:
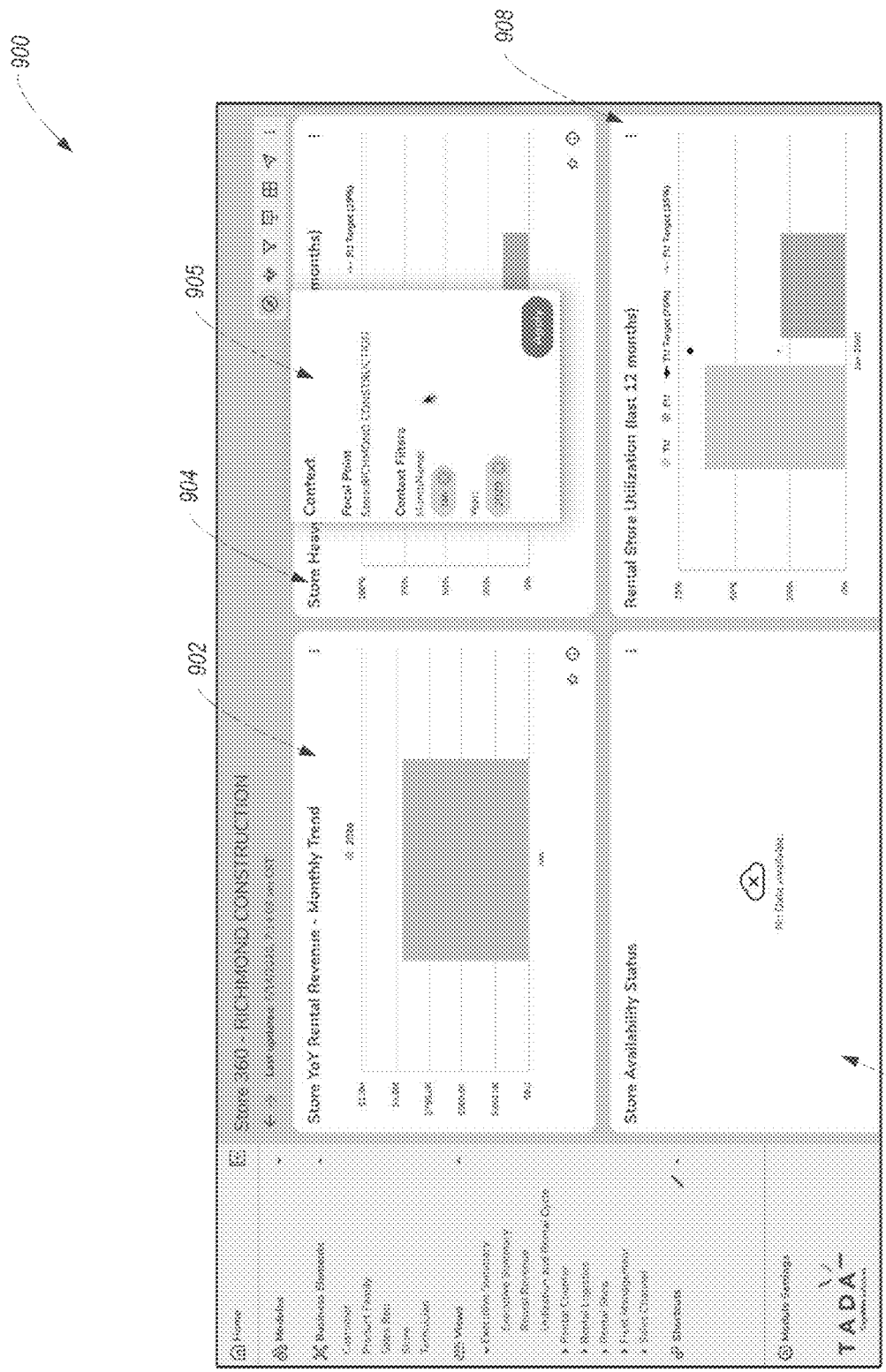
FIG. 9A is an example output produced by a device executing one embodiment of a software tool according to the present disclosure.

For instance, when the computing device receives an indication of the selection of the indicator representing the "08—RICHMOND CONSTRUCTION" store, the computing device may add this particular store to the running context. Then, at block 516, the computing device may cause a third perspective with a third set of widgets to be displayed and may cause the third set of widgets to filter the data that may otherwise be displayed based on the running context, which in the example described, would include the filters January, 2020, revenue, and the "08—RICHMOND CONSTRUCTION" store. FIG. 9A for instance depicts interface 900 displaying a third perspective with a third set of widgets 902, 904, 906, and 908. As depicted for instance, widget 902 is configured to display rental revenue per year but is currently only displaying rental revenue for the year 2020, month January, and for the Richmond Construction store. Widget 904 is configured to display heavy rent utilization by month, but is currently only displaying utilization for the year 2020, month January, and for the Richmond Construction store. Widget 906 is configured to display the availability status of all stores, but is currently only displaying any data related to the status of the Richmond Construction store (which as shown does not have any data to display). Widget 908 is configured to display rental store utilization by month, but is currently only displaying rental store utilization for the year 2020, month January, and for the Richmond Construction store.

Figure 9B:
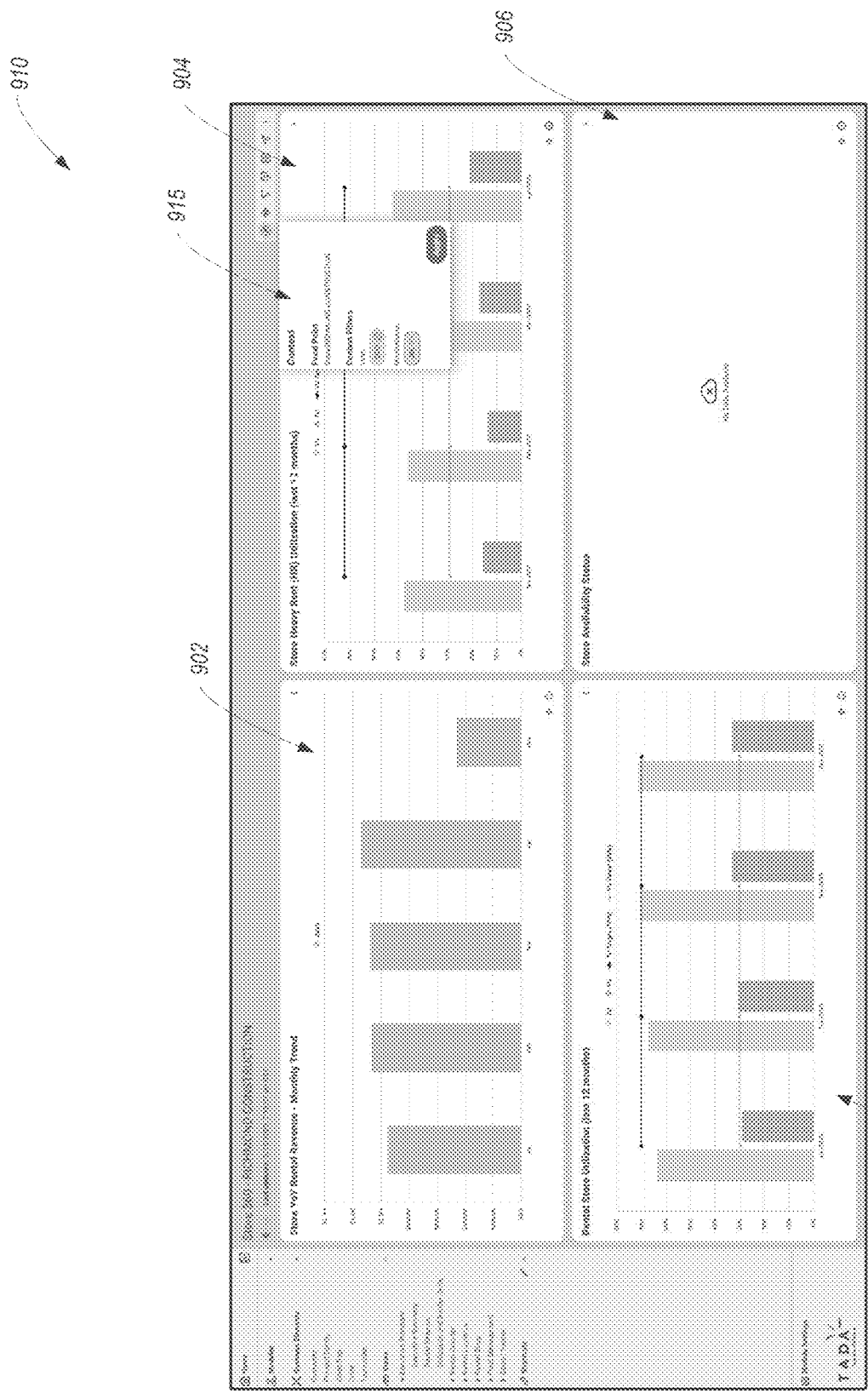
FIG. 9B is an example output produced by a device executing one embodiment of a software tool according to the present disclosure.

As mentioned, one way to modify the running context may be to remove portions of the running context (and thus make the filter broader, which may cause the widgets to show more data). One way to do this may be to hover over an individual filter and click or otherwise select the 'x' or the like in module 905 (FIG. 9A). In response to receiving a selection of an 'x' corresponding to a particular filter (such as "January" in module 905 (FIG. 9A)), the computing device may update the displayed perspective and the displayed widgets to cause them to display additional data that now falls into the broadened filter. For instance, FIG. 9B depicts interface 910 displaying the third perspective with the third set of widgets 902, 904, 906, and 908. As depicted, these widgets now display data related to months in 2020 in addition to January (such as February, March, April, May, etc.). Other ways to modify the running context may be possible as well.

Accordingly, this running context feature allows the computing device to present insights that may be relevant to a given user at a given time. For instance, in the example presented by way of FIGS. 7, 8, 9A-9B, if the user first wanted to understand what products, stores, and compatibility codes went into a particular month's worth of revenue, the user could simply identify the month "January 2020" by clicking on the indicator representing that month. The computing device may then operate to present widgets that display revenue per store, per product, and per compatibility code for January 2020. Then, as a result of displaying this filtered data, the user may want to further filter the information for a particular one of the stores. The user could do this by clicking the indicator for that particular store and the computing device would then operate to present widgets that display revenue per product and per compatibility code for that particular store for January 2020. Notably, in accordance with the present disclosure, the filter for January 2020 was not lost or discarded by the computing device even though the user most recently clicked on an indicator for a store (which, in the abstract has nothing to do with the month of January 2020). Indeed, other software tools may have discarded the January 2020 filter once the computing device received a selection of another indicator for other data. The disclosed software tool, however, continues to drill-down and add to the running context with each subsequent selection of an indicator that represents a type of data. This feature enables insights that, with other software tools, may have required a much more complicated input (such as a complicated database query or the like) in order to instruct the computing device what to display. Or, the desired visualization may not have even been possible at all.

In some embodiments, the computing system may take one or more actions to facilitate efficient data presentation. For instance, in one embodiment, the computing system may attempt to anticipate what data the user might want to filter on so that the computing device can quickly present another widget or perspective without delay. In this respect, the computing device may pre-cache various sets of data from the data network that corresponds to various sets of data represented by the indicators of the widgets currently displayed. In this way, if a user selects a particular indicator, the computing device may determine whether there is a corresponding set of pre-cached data ready to use as the basis of one or more widgets, and if so, the computing device may use that pre-cached data to render a display of one or more widgets.

Figure 10A:
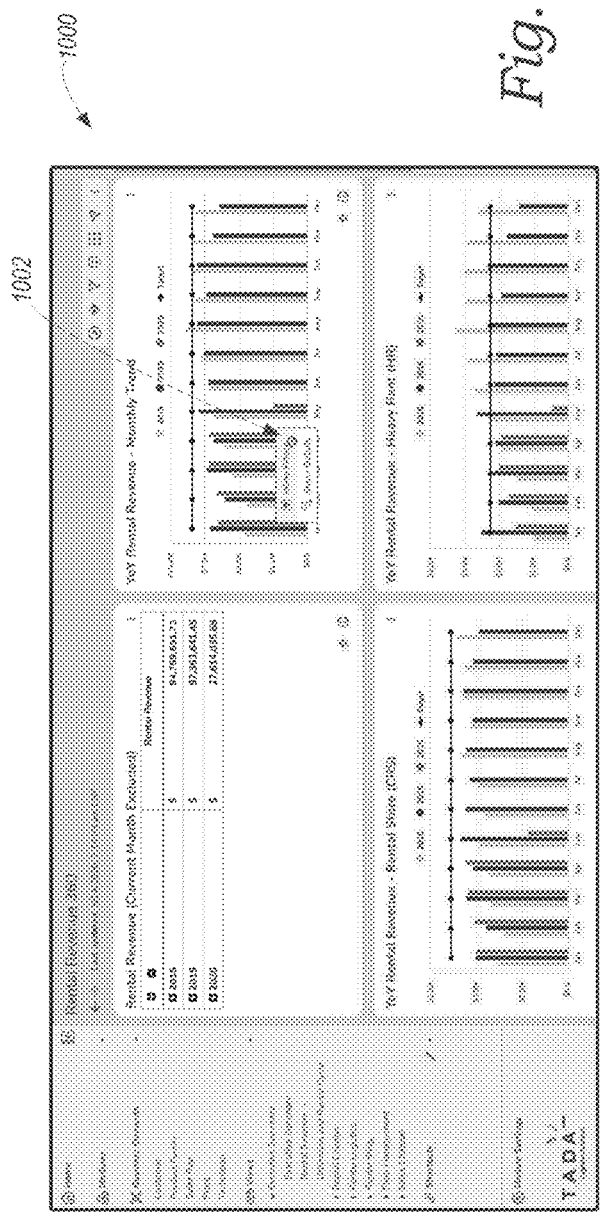
FIG. 10A is an example output produced by a device executing one embodiment of a software tool according to the present disclosure.
Figure 10B:
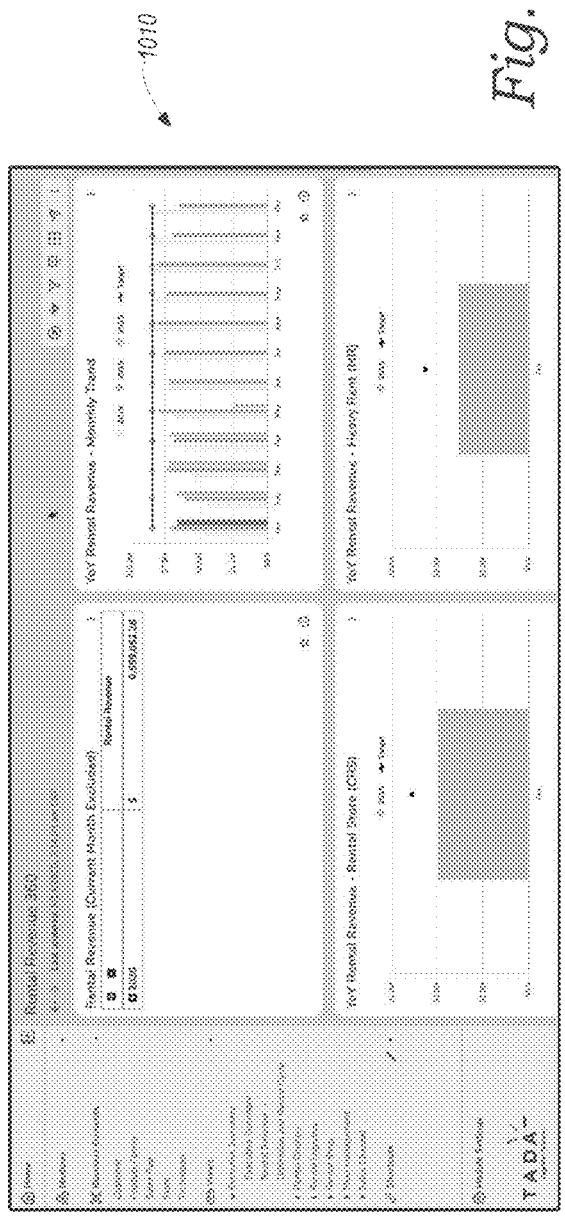
FIG. 10B is an example output produced by a device executing one embodiment of a software tool according to the present disclosure.

In some embodiments, the disclosed navigation tool may have other features and functionality as well. For instance, as one possibility, the navigation tool may include an "inline filter" feature. At a high level, this feature is similar to the running context feature described above, except that in response to receiving a selection of an indicator on a widget, the computing device applies a filter using data represented by the indicator but does not present a new perspective with new widgets. Instead, the computing device applies the filter to the perspective and the widgets that are currently displayed by the computing device. To illustrate an example of this feature, reference is made to interfaces 1000 and 1010 depicted in FIGS. 10A and 10B respectively. To utilize this feature, the user may first select an indicator on widget and selectively enable the inline filter feature. In some implementations, the running context feature described above may be enabled by default such that a normal selection of an indicator of a widget may cause the computing device to engage in the running context feature. As such, to instruct the computing system to utilize the inline filter feature, the user may select the widget with an alternate style selection, such as by holding down a key (e.g., CTRL or ALT) on a keyboard while clicking or otherwise selecting the indicator, or right-clicking the indicator and then selecting an "inline filter" context menu item or the like, an example of which is show in interface 1000 at menu 1002.

Enabling the inline filter feature in this way may, as mentioned, responsively cause the computing device to apply a filter based on the data represented by the selected indicator. As shown in interface 1000, the selected indicator represents data related to January 2020 revenue. Thus, as shown next in interface 1010 (FIG. 10B), the computing device may have created a filter using January 2020 revenue and, responsively cause the other widgets to filter their data to show only data related to January 2020. The computing device may also "grey out" or make transparent the other indicators in the widget from which the user selected the indicator. This presents a visual indicator to the user that the inline filter was generated from this widget and based on the data represented by the indicator that is not greyed out. Other ways to invoke and present inline filters may be possible as well.

Figure 11A:
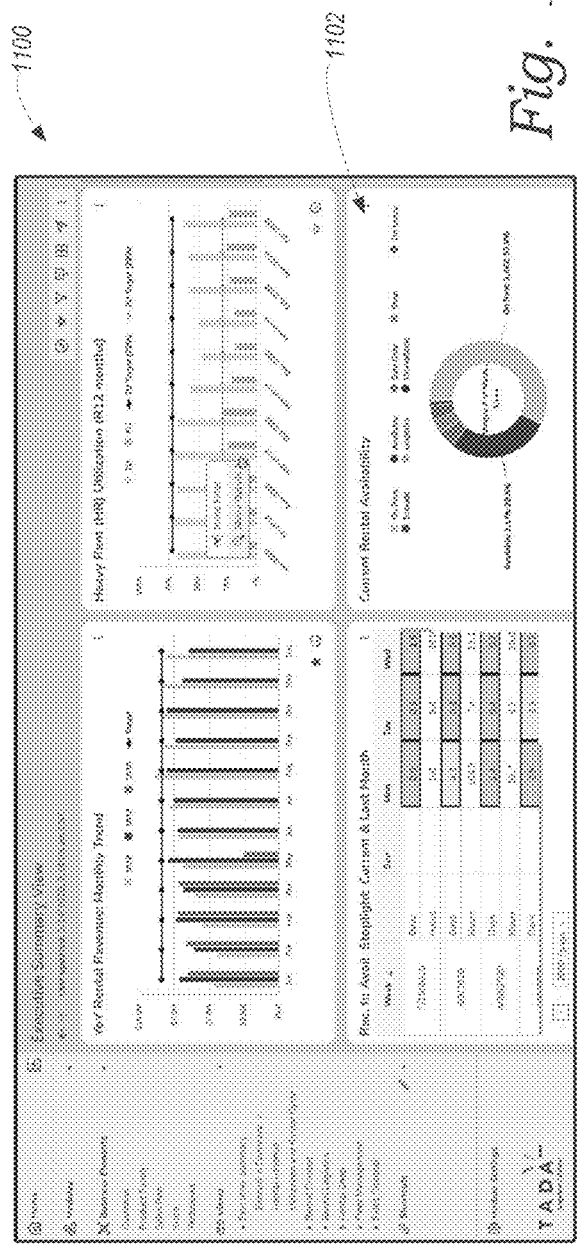
FIG. 11A is an example output produced by a device executing one embodiment of a software tool according to the present disclosure.
Figure 11B:
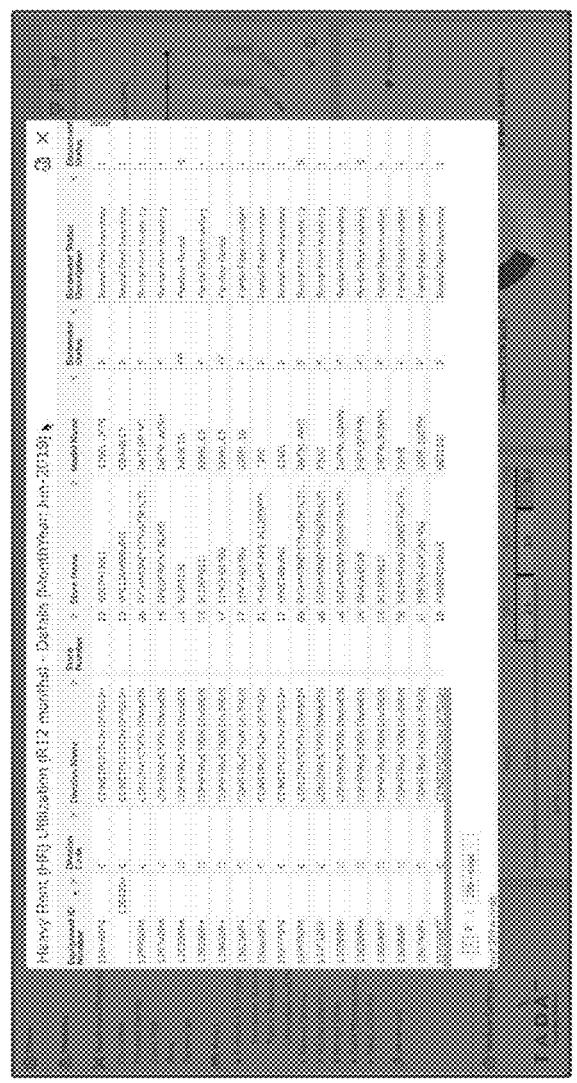
FIG. 11B is an example output produced by a device executing one embodiment of a software tool according to the present disclosure.

As another possible feature, the disclosed navigation tool may include a "show details" feature. At a high level this feature may be used to show the user the underlying source data that is represented by a given indicator on a widget at any given time, even if a filter has been applied to the widget such that a given indicator on the widget is only showing a portion of the full underlying source data. To illustrate an example of this feature, reference is made to interfaces 1100 and 1110 depicted in FIGS. 11A and 11B respectively. To utilize this feature, the user may first select an indicator on widget and selectively enable the show details feature. As mentioned, in some implementations, the running context feature described above may be enabled by default such that a normal selection of a widget may cause the computing device to engage in the running context feature. As such, to instruct the computing system to utilize the show details feature, the user may select the widget with an alternate style selection, such as by holding down a key (e.g., CTRL or ALT) on a keyboard while clicking or otherwise selecting the indicator, or right-clicking the indicator and then selecting a "show details" context menu item or the like, an example of which is show in interface 1100 at menu 1102.

Enabling the show details feature in this way may, as mentioned, responsively cause the computing device to present a display of the underlying data represented by the selected indicator. As shown in interface 1100, the selected indicator represents data related to equipment that has "current rental availability" set to "on rent." Thus, as shown next in interface 1110 (FIG. 11B), the computing device may retrieve the data related to every equipment data entry that has a "current rental availability" set to "on rent" as well show related data for this equipment. The computing device may present this underlying data in table form and may present the table as an overlay on the current interface, although other presentation styles are be possible as well.

As mentioned, the underlying data presented by the computing device in this form may be the data that represented by the selected indicator. This data may be filtered (e.g., according to one or more of the foregoing filter techniques) and may thus not represent all of the underlying data for the organization. For instance, the data may be filtered according to user permissions, where a given user may not have permissions to view or access certain data. In one example, a first user may not have permissions to view data for the current month or for a particular customer, whereas a second user may have full permissions to view data for all months and all customers. For this first user, any widget purporting to represent data related to all months or all customers may not actually represent data for the current month or for the particular customer. For the second user, any widget purporting to represent data related to all months or all customers would actually represent data for the current month or for the particular customer. Thus, if a given widget purporting to represent data related to all months or all customers for the first user was compared side by side with the same widget as displayed for the second user, the widgets would appear as though they were displaying different data (e.g., the given widget as displayed for the first user may appear as though it is displaying less data than the given widget as displayed for the second user). Again, this would be due to the fact that the first user may not have permissions to access or view certain categories of data, and the computing device may accordingly take such permissions into account when determining the set of data by which to represent using the widgets. Thus, in the context of the show details feature, the underlying data shown as a result of invoking the feature may not comprise the full data available to the organization, but rather may only comprise as much data as is available to the given user according to the permissions of that user. Other ways to invoke and present a show details feature may be possible as well.

Figure 12A:
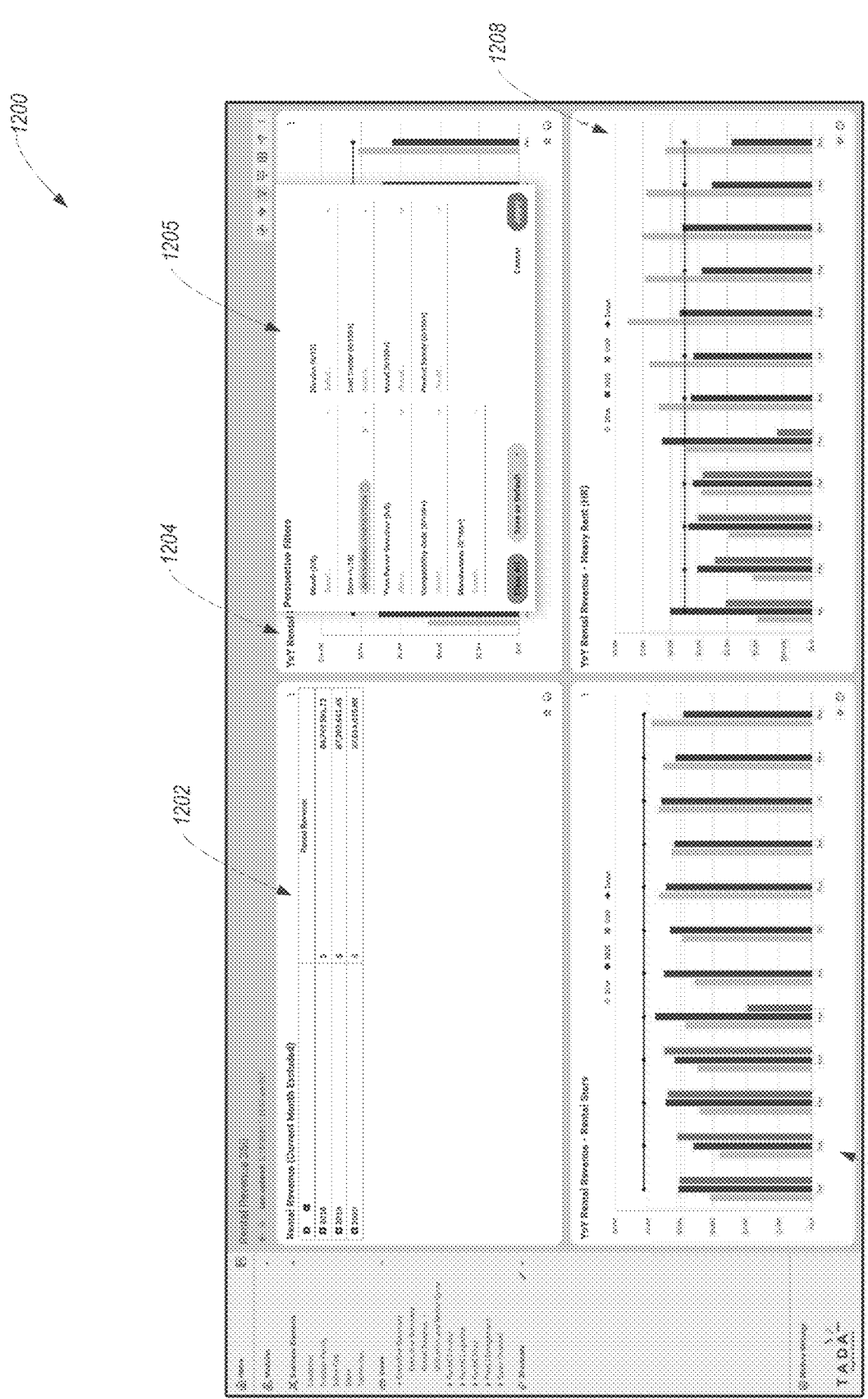
FIG. 12A is an example output produced by a device executing one embodiment of a software tool according to the present disclosure.

As another possible feature, the disclosed navigation tool may include a "manual perspective filter" feature. At a high level this feature may be used to filter the data shown via the widgets of the current perspective without selecting a particular indicator on the widgets. In this way, the data shown via the widgets of the current perspective can be filtered on any data series, including data series that may not be represented by any of the indicators of the widgets shown on the current perspective. FIG. 12A depicts an interface 1200 showing a given perspective with four widgets 1202, 1204, 1206, and 1208. Also shown on the interface is module 1205 within which a user can provide user inputs in order to apply a filter to the given perspective. As shown, module 1205 presents various fields representing possible nodes of the semantic network that may be used to filter the data shown by the widgets in the given perspective. For instance, module 1205 presents a "Month" field a "Store" field, a "Time Period Selection" field, a "Compatibility Code" field, a "Manufacturer" field, a "Division" field, a "Cost Center" field, a Model" field, and a "Product Family" field, among other possible examples. Each of these fields represents one possible node from the semantic network on which a particular value could be used to filter the data presented by the widgets in the given perspective. As shown in the particular example of FIG. 12A, the value "08—RICHMOND CONSTRUCTION" in the "Store" node was input and thus may be used by the computing device to filter the data presented in the widgets of the given perspective, even though this particular store is not represented by any of the data series of the widgets of the given perspective. In some embodiments, the value input into the "Store" field is a selectable value, and if the user desired to adjust the filter with another store, the user could select an alternative entry from a list or the like.

Figure 12B:
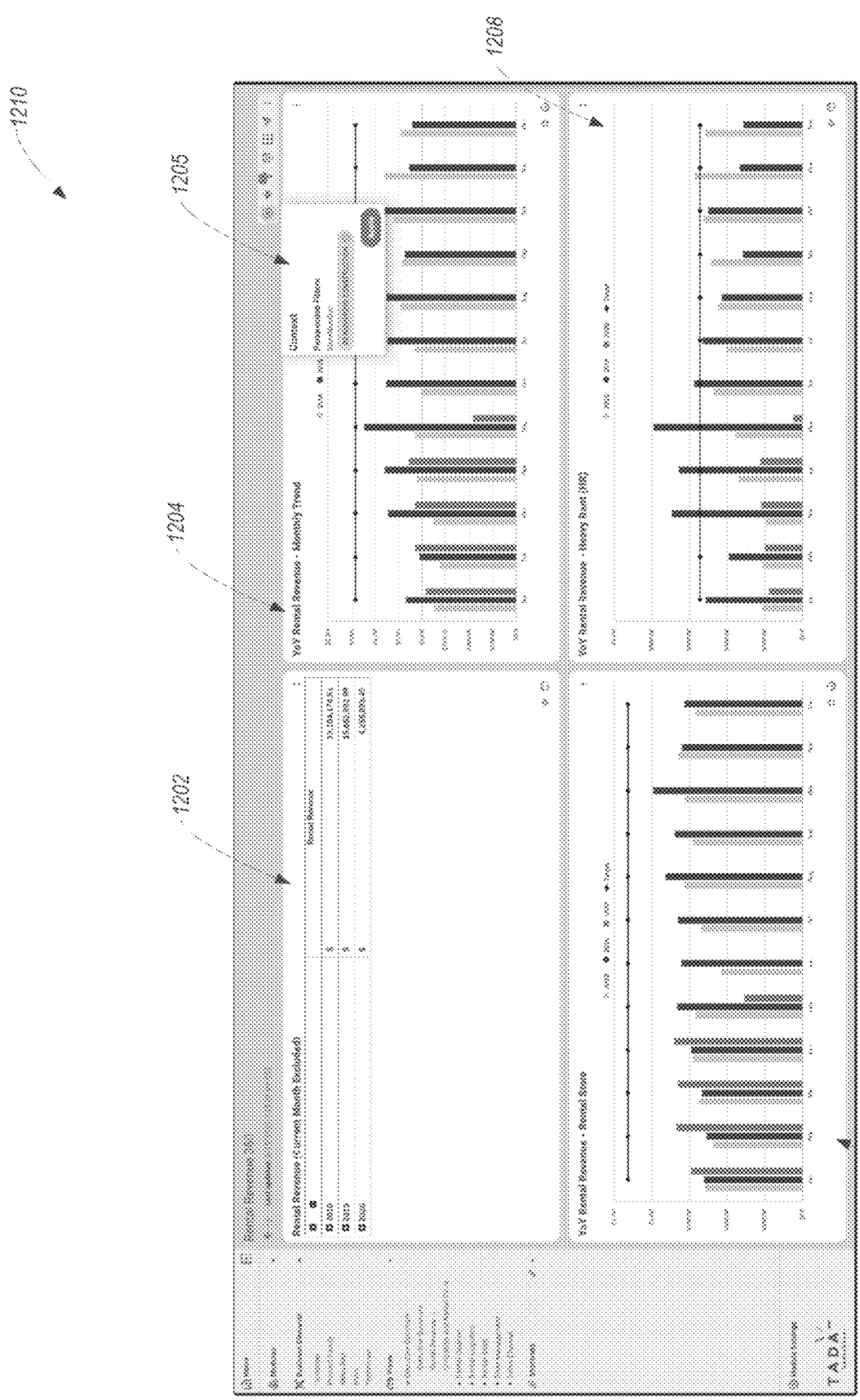
FIG. 12B is an example output produced by a device executing one embodiment of a software tool according to the present disclosure.

FIG. 12B, for instance, depicts an interface 1210 showing the same given perspective with the same widgets 1202, 1204, 1206, and 1208, except that the data represented by the widgets now only represents data related to the "08—RICHMOND CONSTRUCTION" store. Other examples of using a manual perspective filter may be possible as well.

V. CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

The invention claimed is:
1. A computing system comprising:
a network interface;
at least one processor;
a non-transitory computer-readable medium; and
program instructions stored on the non-transitory computer-readable medium that are executable by the at least one processor such that the computing system is capable of:
  presenting a first perspective that comprises at least a first widget, the first widget including at least a first visual indicator that represents respective portions of source data populated via a first node of a semantic network, wherein the semantic network comprises (i) a plurality of nodes and (ii) at least one link, wherein each link links together two or more of the nodes;
  receiving a selection of the first visual indicator;
  creating a filter comprising first filter criteria based on the respective portions of source data represented by the selected first visual indicator;
  identifying a second perspective to be presented, wherein identifying the second perspective comprises (i) determining whether the first node has an associated default perspective assigned to the first node and (ii) if the determination is that the first node has an associated default perspective, selecting the associated default perspective as the second perspective, but if the determination is that the first node does not have an associated default perspective, dynamically creating the second perspective;
  presenting the second perspective, wherein the second perspective comprises at least a second widget, the second widget including one or more second visual indicators that represent respective portions of source data populated via a second node of the semantic network;
  applying the filter to the second perspective such that the one or more second visual indicators represent respective portions of the source data populated via the second node and filtered according to the filter;
  presenting a perspective filter comprising a plurality of fields that may be used to further filter data, wherein each field of the plurality of fields corresponds to a respective node of the semantic network;
  receiving a selection of second filter criteria, wherein the second filter criteria comprises at least one value, wherein each value of the at least one value is associated with a respective field from the plurality of fields of the perspective filter, and wherein each respective field from the plurality of fields corresponds to a respective node of the semantic network that is different than the first and second nodes of the semantic network;
  modifying the filter based on the selection of second filter criteria; and
  applying the modified filter to the second perspective such that the one or more second visual indicators represent respective portions of the source data populated via the second node and filtered according to the modified filter.

2. The computing system of claim 1, wherein one or more value of the at least one value is not represented by any of the one or more second visual indicators that represent respective portions of source data.

3. The computing system of claim 1, wherein the program instructions are further executable by the at least one processor such that the computing system is further capable of:
displaying a running context indicator that comprises an indication of the first filter criteria and the second filter criteria.

4. The computing system of claim 3, wherein the indication of the first filter criteria and the second filter criteria indicates an order in which the first filter criteria and the second filter criteria were applied.

5. The computing system of claim 1, wherein the first perspective and second perspective are presented for a given user, and wherein the program instructions are further executable by the at least one processor such that the computing system is further capable of:
prior to presenting the first perspective and presenting the second perspective, defining a user permission associated with the given user, and wherein (i) the respective portions of the source data filtered according to the filter are further filtered according to the user permission associated with the given user and (ii) the respective portions of the source data filtered according to the modified filter are further filtered according to the user permission associated with the given user.

6. The computing system of claim 1, wherein the program instructions are further executable by the at least one processor such that the computing system is further capable of:
pre-caching various sets of data that correspond to various sets of data represented by indicators of widgets available for display.

7. The computing system of claim 1, wherein the program instructions are further executable by the at least one processor such that the computing system is further capable of:
receiving a particular selection of the first visual indicator, the particular selection of the first visual indicator indicating a desire to display additional details for the respective portion of source data represented by the selected first visual indicator; and
in response to receiving the particular selection, presenting a display that includes at least a portion of underlying data represented by the selected first visual indicator.

8. The computing system of claim 7, wherein the display that includes at least a portion of underlying data represented by the selected first visual indicator comprises an overlay display that includes at least a portion of underlying data represented by the selected first visual indicator.

9. The computing system of claim 1, wherein the program instructions are further executable by the at least one processor such that the computing system is further capable of:
receiving a selection of one of the one or more second visual indicators;
modifying the modified filter to form a second modified filter by adding to the modified filter third filter criteria based on the respective portion of source data represented by the selected one of the one or more second visual indicators, whereby the second modified filter comprises the first filter criteria, the second filter criteria, and the third filter criteria;

presenting a third perspective that comprises at least a third widget, the third widget including at least a third visual indicator that represents respective portions of source data; and applying the second modified filter to the third perspective such that the third visual indicator represents respective portions of the source data filtered according to the second modified filter.

10. The computing system of claim 1, wherein the first perspective comprises a first set of widgets including the first widget, and
wherein the second perspective comprises a second set of widgets including the second widget, the second set of widgets being different from the first set of widgets.

11. The computing system of claim 1, wherein the program instructions stored on the non-transitory computer-readable medium that are executable by the at least one processor such that the computing system is capable of identifying a second perspective to be presented, wherein identifying the second perspective comprises (i) determining whether the first node has an associated default perspective assigned to the first node and (ii) if the determination is that the first node has an associated default perspective, selecting the associated default perspective as the second perspective, but if the determination is that the first node does not have an associated default perspective, dynamically creating the second perspective comprise program instructions stored on the non-transitory computer-readable medium that are executable by the at least one processor such that the computing system is capable of:
dynamically creating the second perspective by (i) identifying one or more widgets relevant to the data represented by the selected first indicator and (ii) using the identified one or more widgets, dynamically stitching together a new perspective to serve as the second perspective.

12. The computing system of claim 1, wherein the program instructions stored on the non-transitory computer-readable medium that are executable by the at least one processor such that the computing system is capable of identifying a second perspective to be presented, wherein identifying the second perspective comprises (i) determining whether the first node has an associated default perspective assigned to the first node and (ii) if the determination is that the first node has an associated default perspective, selecting the associated default perspective as the second perspective, but if the determination is that the first node does not have an associated default perspective, dynamically creating the second perspective comprise program instructions stored on the non-transitory computer-readable medium that are executable by the at least one processor such that the computing system is capable of:
dynamically creating the second perspective by (i) prompting the user to select a perspective from among a list of existing perspectives and (ii) using a selected perspective to serve as the second perspective.

13. A method comprising:
presenting a first perspective that comprises at least a first widget, the first widget including at least a first visual indicator that represents respective portions of source data populated via a first node of a semantic network, wherein the semantic network comprises (i) a plurality of nodes and (ii) at least one link, wherein each link links together two or more of the nodes;

receiving a selection of the first visual indicator;

creating a filter comprising first filter criteria based on the respective portions of source data represented by the selected first visual indicator;

identifying a second perspective to be presented, wherein identifying the second perspective comprises (i) determining whether the first node has an associated default perspective assigned to the first node and (ii) if the determination is that the first node has an associated default perspective, selecting the associated default perspective as the second perspective, but if the determination is that the first node does not have an associated default perspective, dynamically creating the second perspective;

presenting the second perspective, wherein the second perspective comprises at least a second widget, the second widget including one or more second visual indicators that represent respective portions of source data populated via a second node of the semantic network;

applying the filter to the second perspective such that the one or more second visual indicators represent respective portions of the source data populated via the second node and filtered according to the filter;

presenting a perspective filter comprising a plurality of fields that may be used to further filter data, wherein each field of the plurality of fields corresponds to a respective node of the semantic network;

receiving a selection of second filter criteria, wherein the second filter criteria comprises at least one value, wherein each value of the at least one value is associated with a respective field from the plurality of fields of the perspective filter, and wherein each respective field from the plurality of fields corresponds to a respective node of the semantic network that is different than the first and second nodes of the semantic network;

modifying the filter based on the selection of second filter criteria; and applying the modified filter to the second perspective such that the one or more second visual indicators represent respective portions of the source data populated via the second node and filtered according to the modified filter.

14. The method of claim 13, wherein one or more value of the at least one value is not represented by any of the one or more second visual indicators that represent respective portions of source data.

15. The method of claim 13, further comprising:
displaying a running context indicator that comprises an indication of the first filter criteria and the second filter criteria.

16. The method of claim 13, wherein the first perspective and second perspective are presented for a given user, and the method further comprising:
prior to presenting the first perspective and presenting the second perspective, defining a user permission associated with the given user, and wherein (i) the respective portions of the source data filtered according to the filter are further filtered according to the user permission associated with the given user and (ii) the respective portions of the source data filtered according to the modified filter are further filtered according to the user permission associated with the given user.

17. The method of claim 13, further comprising:
pre-caching various sets of data that correspond to various sets of data represented by indicators of widgets available for display.

18. The method claim 13, further comprising:
receiving a particular selection of the first visual indicator, the particular selection of the first visual indicator indicating a desire to display additional details for the respective portion of source data represented by the selected first visual indicator; and in response to receiving the particular selection, presenting a display that includes at least a portion of underlying data represented by the selected first visual indicator.

19. A non-transitory computer-readable storage medium having program instructions stored thereon that are executable by at least one processor of a computing system such that the computing system is capable of:

presenting a first perspective that comprises at least a first widget, the first widget including at least a first visual indicator that represents respective portions of source data populated via a first node of a semantic network, wherein the semantic network comprises (i) a plurality of nodes and (ii) at least one link, wherein each link links together two or more of the nodes;

receiving a selection of the first visual indicator;

creating a filter comprising first filter criteria based on the respective portions of source data represented by the selected first visual indicator;

identifying a second perspective to be presented, wherein identifying the second perspective comprises (i) determining whether the first node has an associated default perspective assigned to the first node and (ii) if the determination is that the first node has an associated default perspective, selecting the associated default perspective as the second perspective, but if the determination is that the first node does not have an associated default perspective, dynamically creating the second perspective;

presenting the second perspective, wherein the second perspective comprises at least a second widget, the second widget including one or more second visual indicators that represent respective portions of source data populated via a second node of the semantic network;

applying the filter to the second perspective such that the one or more second visual indicators represent respective portions of the source data populated via the second node and filtered according to the filter;

presenting a perspective filter comprising a plurality of fields that may be used to further filter data, wherein each field of the plurality of fields corresponds to a respective node of the semantic network;

receiving a selection of second filter criteria, wherein the second filter criteria comprises at least one value, wherein each value of the at least one value is associated with a respective field from the plurality of fields of the perspective filter, and wherein each respective field from the plurality of fields corresponds to a respective node of the semantic network that is different than the first and second nodes of the semantic network;

modifying the filter based on the selection of second filter criteria; and applying the modified filter to the second perspective such that the one or more second visual indicators represent respective portions of the source data populated via the second node and filtered according to the modified filter.

20. The non-transitory computer-readable storage medium of claim 19, wherein one or more value of the at least one value is not represented by any of the one or more second visual indicators that represent respective portions of source data.

21. The non-transitory computer-readable storage medium of claim 19, wherein the program instructions are further executable by the at least one processor such that the computing system is further capable of:

displaying a running context indicator that comprises an indication of the first filter criteria and the second filter criteria.

22. The non-transitory computer-readable storage medium of claim 19, wherein the first perspective and second perspective are presented for a given user, and wherein the program instructions are further executable by the at least one processor such that the computing system is further capable of:

prior to presenting the first perspective and presenting the second perspective, defining a user permission associated with the given user, and wherein (i) the respective portions of the source data filtered according to the filter are further filtered according to the user permission associated with the given user and (ii) the respective portions of the source data filtered according to the modified filter are further filtered according to the user permission associated with the given user.

\* \* \* \* \*